US012319523B2

(12) United States Patent
Mellits et al.

(10) Patent No.: US 12,319,523 B2
(45) Date of Patent: Jun. 3, 2025

(54) DOCK LEVELER WITH LIP HINGE

(71) Applicant: Overhead Door Corporation, Lewisville, TX (US)

(72) Inventors: Kirk E. Mellits, Fort Worth, TX (US); Girish Malligere, Frisco, TX (US); Philip Sotak, Lewisville, TX (US); Ruiping Ouyang, Richardson, TX (US)

(73) Assignee: Overhead Door Corporatior, Lewisville, TX (US)

( * ) Notice: Subject to any disclaimer, the term of this patent is extended or adjusted under 35 U.S.C. 154(b) by 517 days.

(21) Appl. No.: 17/743,026

(22) Filed: May 12, 2022

(65) Prior Publication Data

US 2023/0365362 A1  Nov. 16, 2023

(51) Int. Cl.
*B65G 69/28* (2006.01)

(52) U.S. Cl.
CPC ........ *B65G 69/287* (2013.01); *B65G 69/2811* (2013.01)

(58) Field of Classification Search
CPC .. B65G 69/287; B65G 69/2811; B65G 69/28; B65G 69/2805; B65G 69/2841
See application file for complete search history.

(56) References Cited

U.S. PATENT DOCUMENTS

| | | |
|---|---|---|
| 2,644,971 A | 7/1953 | Rowe |
| 3,071,790 A | 1/1963 | Clear |
| 3,137,017 A | 6/1964 | Pfleger |
| 3,235,896 A | 2/1966 | Riggs |
| 3,316,575 A | 5/1967 | Larsen et al. |
| 3,323,158 A | 6/1967 | Martin |
| 3,334,368 A | 8/1967 | Mcintosh |
| 3,368,229 A | 2/1968 | Pfleger |
| 3,411,168 A | 11/1968 | Hecker |
| 3,460,175 A | 8/1969 | Beckwith et al. |
| 3,475,778 A | 11/1969 | Merrick |
| 3,486,181 A | 12/1969 | Hecker, Jr. et al. |
| 3,493,984 A | 2/1970 | Reinhard |
| 3,500,486 A | 3/1970 | Le Clear |
| 3,516,103 A | 6/1970 | Hecker, Jr. et al. |
| 3,570,033 A | 3/1971 | Hovestad et al. |
| 3,583,014 A | 6/1971 | Brown et al. |
| 3,587,126 A | 6/1971 | Potter |
| 3,636,578 A | 1/1972 | Dieter |
| 3,646,627 A | 3/1972 | Potter |
| 3,665,538 A | 5/1972 | Smith |

(Continued)

OTHER PUBLICATIONS

US 9,376,274 B1, 06/2016, Stone et al. (withdrawn)

*Primary Examiner* — Abigail A Risic
(74) *Attorney, Agent, or Firm* — Haynes and Boone, LLP

(57) ABSTRACT

A dock leveler with a lip hinge. The dock leveler may include a lip that may be disposed at a front portion of a deck. The deck and the lip may be connected via a joint to allow the lip to pivot relative to the deck. The joint may comprise a C-shaped shaft coupled to one of the lip and the deck. The C-shaped shaft may have a hollow interior and a radial opening to the hollow interior, the opening being less than 180 degrees. The joint may further comprise a pivot bar coupled to either the deck or the lip. The pivot bar may be pivotably disposed in the hollow interior of the C-shaped shaft in a manner allowing the lip to pivot relative to the deck between a down position and an up position.

22 Claims, 26 Drawing Sheets

(56) References Cited

U.S. PATENT DOCUMENTS

| | | | |
|---|---|---|---|
| 3,766,585 A | 10/1973 | Yoon | |
| 3,786,530 A | 1/1974 | Leclear | |
| 3,835,497 A | 9/1974 | Smith | |
| 3,839,761 A | 10/1974 | Stevenson | |
| 3,858,264 A | 1/1975 | Kuhns et al. | |
| 3,882,563 A | 5/1975 | Smith | |
| 3,883,917 A | 5/1975 | Alten | |
| 3,921,241 A | 11/1975 | Smith | |
| 3,967,337 A | 7/1976 | Artzberger | |
| 3,974,537 A | 8/1976 | Ellis et al. | |
| 3,982,295 A | 9/1976 | Burnham | |
| 3,984,891 A * | 10/1976 | Weinmann | B65G 69/30 |
| | | | 14/69.5 |
| 3,997,932 A | 12/1976 | Artzberger | |
| 4,014,059 A | 3/1977 | Artzberger | |
| 4,065,824 A | 1/1978 | Ellis et al. | |
| 4,068,338 A | 1/1978 | Artzberger | |
| 4,081,874 A | 4/1978 | Artzberger | |
| 4,091,488 A | 5/1978 | Artzberger | |
| 4,126,909 A | 11/1978 | Smith | |
| RE30,104 E | 10/1979 | Burnham | |
| 4,257,137 A | 3/1981 | Hipp et al. | |
| 4,398,315 A | 8/1983 | Driear et al. | |
| 4,402,100 A | 9/1983 | Slusar | |
| 4,450,598 A * | 5/1984 | Larsen | B65G 69/287 |
| | | | 14/71.1 |
| 4,455,703 A | 6/1984 | Fromme et al. | |
| 4,525,887 A | 7/1985 | Erlandsson et al. | |
| 4,531,248 A | 7/1985 | Swessel et al. | |
| 4,570,277 A | 2/1986 | Hahn et al. | |
| 4,665,579 A | 5/1987 | Bennett | |
| 4,689,846 A | 9/1987 | Sherrod | |
| 4,703,534 A | 11/1987 | Pedersen | |
| 4,776,052 A | 10/1988 | Delgado et al. | |
| 4,847,935 A | 7/1989 | Alexander et al. | |
| 4,865,507 A | 9/1989 | Trickle | |
| 4,935,979 A | 6/1990 | Walker et al. | |
| 4,937,906 A | 7/1990 | Alexander | |
| 4,974,276 A | 12/1990 | Alexander | |
| 5,040,258 A | 8/1991 | Hahn | |
| 5,117,526 A | 6/1992 | Alexander | |
| 5,123,135 A | 6/1992 | Cook et al. | |
| 5,195,205 A | 3/1993 | Cook | |
| 5,214,818 A | 6/1993 | Cook | |
| 5,274,867 A | 1/1994 | Hageman | |
| 5,303,443 A | 4/1994 | Alexander | |
| 5,311,628 A | 5/1994 | Springer et al. | |
| 5,317,775 A | 6/1994 | das Dores | |
| 5,343,583 A | 9/1994 | Cook | |
| 5,347,672 A * | 9/1994 | Everard | B60P 1/43 |
| | | | 160/133 |
| 5,440,772 A | 8/1995 | Springer | |
| 5,446,937 A * | 9/1995 | Haskins | B65G 69/287 |
| | | | 254/88 |
| 5,450,643 A | 9/1995 | Warner | |
| 5,551,113 A | 9/1996 | Marler et al. | |
| 5,560,063 A | 10/1996 | Alten | |
| 5,586,355 A | 12/1996 | Metz et al. | |
| 5,621,938 A | 4/1997 | Warner | |
| 5,644,812 A | 7/1997 | Neufeldt et al. | |
| 5,657,502 A | 8/1997 | Ellis | |
| 5,815,871 A * | 10/1998 | Borchardt | B65G 69/2823 |
| | | | 14/71.3 |
| 6,061,859 A | 5/2000 | Winter | |
| 6,085,375 A | 7/2000 | Holm | |
| 6,098,227 A | 8/2000 | Meichtry et al. | |
| 6,112,353 A | 9/2000 | Winter | |
| 6,125,491 A | 10/2000 | Alexander | |
| 6,163,913 A | 12/2000 | DiSieno et al. | |
| 6,205,606 B1 | 3/2001 | Zibella et al. | |
| 6,240,587 B1 | 6/2001 | Meichtry et al. | |
| 6,327,733 B1 | 12/2001 | Alexander et al. | |
| 6,368,043 B1 | 4/2002 | Leum | |
| 6,370,719 B1 * | 4/2002 | Alexander | B65G 69/287 |
| | | | 14/71.1 |
| 6,389,629 B1 * | 5/2002 | Schouest | B60P 1/43 |
| | | | 16/269 |
| 6,405,397 B1 | 6/2002 | Alexander | |
| 6,442,783 B1 | 9/2002 | Yoon et al. | |
| 6,473,926 B2 | 11/2002 | Lounsbury | |
| 6,481,038 B2 | 11/2002 | Lounsbury et al. | |
| 6,487,741 B2 | 12/2002 | Alexander | |
| 6,629,328 B2 | 10/2003 | Widule | |
| 6,711,774 B2 | 3/2004 | Hodges | |
| 6,760,944 B2 | 7/2004 | Hodges | |
| 6,769,149 B2 | 8/2004 | Alexander | |
| 6,820,295 B2 | 11/2004 | Webster | |
| 6,834,409 B2 | 12/2004 | Gleason | |
| 6,892,411 B1 | 5/2005 | Yoon et al. | |
| 6,910,239 B2 | 6/2005 | Hodges | |
| 6,931,686 B2 | 8/2005 | Hoofard et al. | |
| 6,951,041 B2 | 10/2005 | Hoofard et al. | |
| 6,973,693 B1 | 12/2005 | Mayer et al. | |
| 6,988,289 B2 | 1/2006 | Pedersen et al. | |
| 7,013,519 B2 | 3/2006 | Gleason | |
| 7,017,220 B2 | 3/2006 | Alexander et al. | |
| 7,032,267 B2 | 4/2006 | Mitchell | |
| 7,043,790 B2 | 5/2006 | Alexander | |
| 7,047,584 B2 | 5/2006 | Hoofard et al. | |
| 7,062,813 B2 | 6/2006 | Hoofard et al. | |
| 7,100,233 B2 | 9/2006 | Alexander et al. | |
| 7,131,160 B2 | 11/2006 | Alexander et al. | |
| 7,134,159 B2 | 11/2006 | Muhl | |
| 7,162,761 B2 | 1/2007 | Alexander et al. | |
| 7,213,285 B2 | 5/2007 | Mitchell | |
| 7,213,286 B2 | 5/2007 | Hoofard et al. | |
| 7,216,392 B2 | 5/2007 | Hoofard et al. | |
| 7,225,493 B2 | 6/2007 | Hoofard et al. | |
| 7,353,558 B2 | 4/2008 | Alexander et al. | |
| 7,363,670 B2 | 4/2008 | Mitchell et al. | |
| 7,409,739 B2 | 8/2008 | Whitley | |
| D579,754 S | 11/2008 | Gleason | |
| 7,546,655 B2 | 6/2009 | Mitchell et al. | |
| 7,657,957 B2 | 2/2010 | Alexander et al. | |
| 7,865,992 B1 | 1/2011 | Ion | |
| 7,926,140 B2 | 4/2011 | Whitley et al. | |
| 7,996,943 B2 | 8/2011 | Wallis et al. | |
| 8,132,280 B2 | 3/2012 | Gleason et al. | |
| 8,141,189 B2 | 3/2012 | Mitchell et al. | |
| 8,327,486 B2 | 12/2012 | Fontaine et al. | |
| 8,407,842 B2 | 4/2013 | Story et al. | |
| 8,544,130 B2 | 10/2013 | Sveum | |
| 8,627,529 B1 | 1/2014 | Palmersheim | |
| 9,150,368 B2 | 10/2015 | Hodges | |
| 9,284,135 B2 | 3/2016 | Sveum | |
| 9,546,056 B2 | 1/2017 | Stone et al. | |
| 9,938,094 B1 | 4/2018 | Leum et al. | |
| 9,944,475 B1 | 4/2018 | Leum et al. | |
| 10,040,646 B2 | 8/2018 | Campbell et al. | |
| 10,597,242 B1 | 3/2020 | Sivakumar | |
| 11,273,999 B1 | 3/2022 | Leum | |
| 11,352,797 B2 * | 6/2022 | Winter | E04F 11/002 |
| 11,440,754 B2 * | 9/2022 | Bunker, II | F16B 45/00 |
| 11,511,954 B2 | 11/2022 | Leum | |
| 2005/0011020 A1 | 1/2005 | Alexander et al. | |
| 2005/0132512 A1 | 6/2005 | Muhl et al. | |
| 2005/0160540 A1 | 7/2005 | Hoofard | |
| 2005/0251934 A1 | 11/2005 | Yoon et al. | |
| 2005/0273949 A1 | 12/2005 | Gleason | |
| 2006/0021164 A1 * | 2/2006 | Mitchell | B65G 69/2811 |
| | | | 14/71.1 |
| 2006/0042030 A1 | 3/2006 | Yoon et al. | |
| 2006/0045678 A1 | 3/2006 | Andersen | |
| 2006/0156493 A1 | 7/2006 | Alexander et al. | |
| 2007/0017043 A1 | 1/2007 | Alexander et al. | |
| 2007/0017044 A1 | 1/2007 | Alexander et al. | |
| 2007/0180633 A1 * | 8/2007 | Whitley | B65G 69/287 |
| | | | 14/71.1 |
| 2007/0226923 A1 | 10/2007 | Alexander et al. | |
| 2015/0013083 A1 | 1/2015 | Palmersheim | |

(56) References Cited

U.S. PATENT DOCUMENTS

| | | | |
|---|---|---|---|
| 2017/0073176 A1* | 3/2017 | Yule | E01D 18/00 |
| 2022/0332528 A1 | 10/2022 | Shahbazian | |
| 2024/0253918 A1* | 8/2024 | Kikstra | B65G 69/2811 |

* cited by examiner

# DOCK LEVELER WITH LIP HINGE

TECHNICAL FIELD

The present disclosure relates generally to dock levelers for bridging the gap between a loading dock and a bed of a truck, trailer, or other transport.

BACKGROUND

Loading dock levelers, such as mechanical dock levelers, hydraulic dock levelers, air dock levelers, and vertical dock levers, are used to bridge the gap and height difference between a loading dock and a trailer, truck bed, or other transport. The loading dock levelers also compensate for up and down float of the transport during loading and unloading. Typically, dock levelers are installed in a pit that is formed in the loading dock allowing for upward and downward movement from the dock floor to the transport. Current pit dock levelers use a large steel frame to provide stability and a connection point for all the components.

Problems arise in current dock leveler designs. For example, installation of large dock levelers having a base frame is cumbersome and dangerous, and it may require a technician to crawl under the heavy deck of the dock leveler to perform maintenance on the frame. Furthermore, the frame can trap many free-floating items including garbage requiring someone to crawl under the deck of the dock leveler to clean it out. In addition, current installation methods create a weak point between the dock leveler and the dock surface that is prone to break during regular use of heavy loads passing between the dock leveler and the dock surface.

This disclosure is directed to innovative and new dock leveler designs that may address one or more of these or other shortcomings of conventional dock leveler systems including using fewer parts and improving the efficiency of installation and operation. These designs may also lead to lower manufacturing costs.

SUMMARY

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

Another embodiment of the present disclosure is a dock leveler comprising a deck, a lip, a joint, and a pivot bar. The deck may have a front portion and a rear portion. The lip may be disposed at the front portion of the deck, and may have a top surface, a front surface, and a rear surface. The joint may connect the deck to the lip to allow the lip to pivot relative to the deck. In some embodiments, the joint may comprise a C-shaped shaft coupled to one of the lip and the deck, where the C-shaped shaft has a hollow interior and a radial opening to the hollow interior. In some embodiments, the radial opening of the C-shaped shaft may be less than 180 degrees. The pivot bar may be coupled to the other of the deck and the lip such that the pivot bar is pivotably disposed in the hollow interior of the C-shaped shaft and in a manner allowing the lip to pivot relative to the deck between a down position and an up position.

In some instances, the dock leveler may comprise a deck, a lip, and a cylinder joint. The deck may have a front portion and a rear portion. The lip may be disposed at the front portion of the deck and may have a top surface, a front surface, and a rear surface. In some embodiments, the cylinder joint may connect the deck to the lip to allow the lip to pivot relative to the deck. The cylinder joint may have a radial pivot opening of less than 180 degrees.

Another embodiment of the present disclosure is a dock leveler that may comprise a deck and a lip. The deck may have a front portion and a rear portion. The lip may be pivotably disposed at the front portion of the deck and may have a top surface and a bottom surface. In some embodiments, the lip may have a leading end with a bevel formed thereon, the bevel being formed on an underside of the lip to provide a minimal transition from a delivery bed to the top surface of the lip.

It is to be understood that both the foregoing general description and the following drawings and detailed description are exemplary and explanatory in nature and are intended to provide an understanding of the present disclosure without limiting the scope of the present disclosure. In that regard, additional aspects, features, and advantages of the present disclosure will be apparent to one skilled in the art from the following. One or more features of any embodiment or aspect may be combinable with one or more features of other embodiment or aspect.

BRIEF DESCRIPTION OF THE DRAWINGS

The accompanying drawings illustrate implementations of the systems, devices, and methods disclosed herein and together with the description, serve to explain the principles of the present disclosure.

Figure 1:
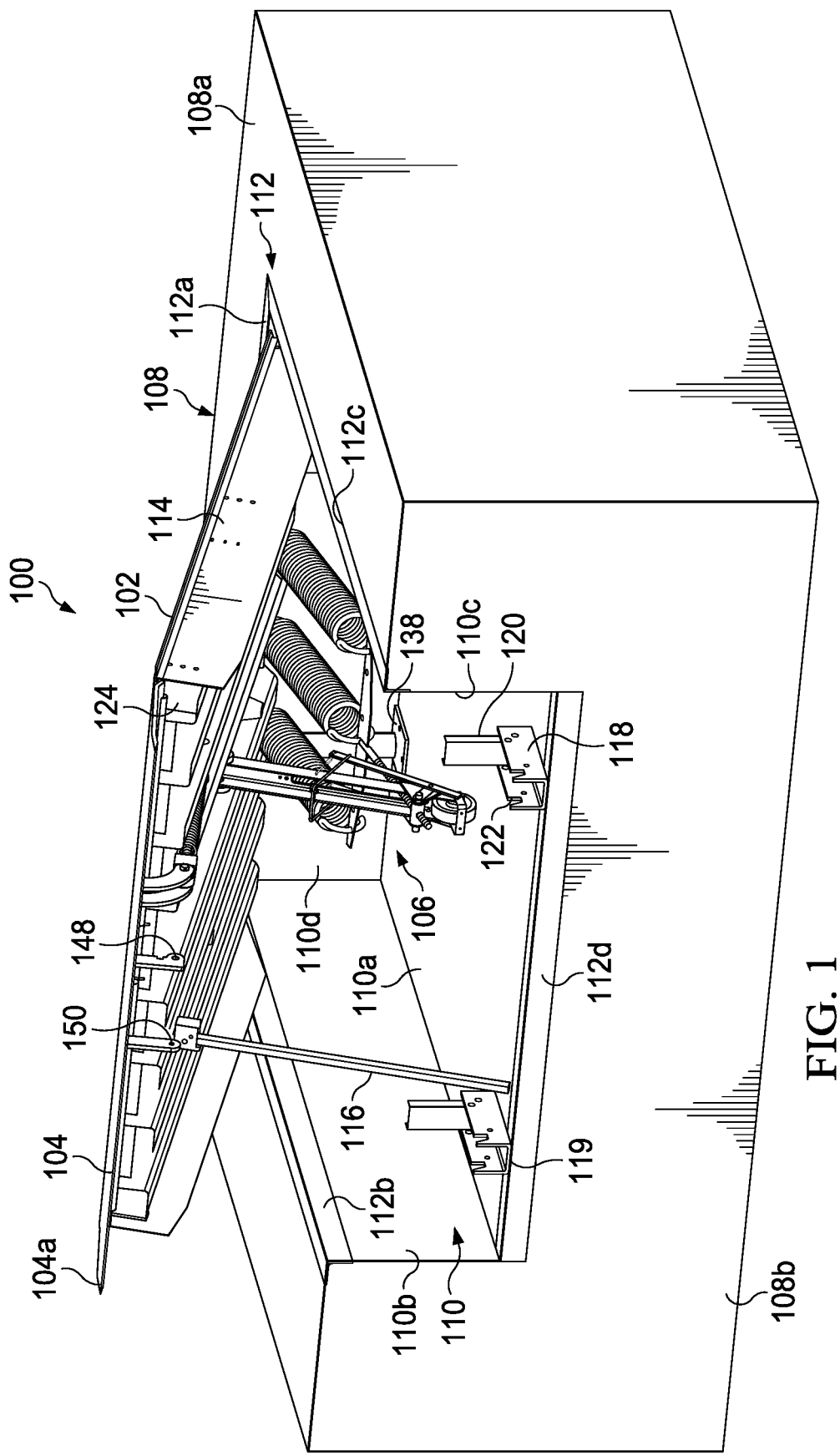
FIG. 1 is a perspective illustration of a dock leveler in a raised position and installed in a dock pit of a loading dock, according to one example implementation.

These Figures will be better understood by reference to the following Detailed Description.

DETAILED DESCRIPTION

For promoting an understanding of the principles of the present disclosure, reference will now be made to the implementations illustrated in the drawings and specific language will be used to describe them. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In addition, this disclosure describes some elements or features in detail with respect to one or more implementations or Figures, when those same elements or features appear in subsequent Figures, without such a high level of detail. It is fully contemplated that the features, components, and/or steps described with respect to one or more implementations or Figures may be combined with the features, components, and/or steps described with respect to other implementations or Figures of the present disclosure. For simplicity, in some instances the same or similar reference numbers are used throughout the drawings to refer to the same or like parts.

Figure 2:
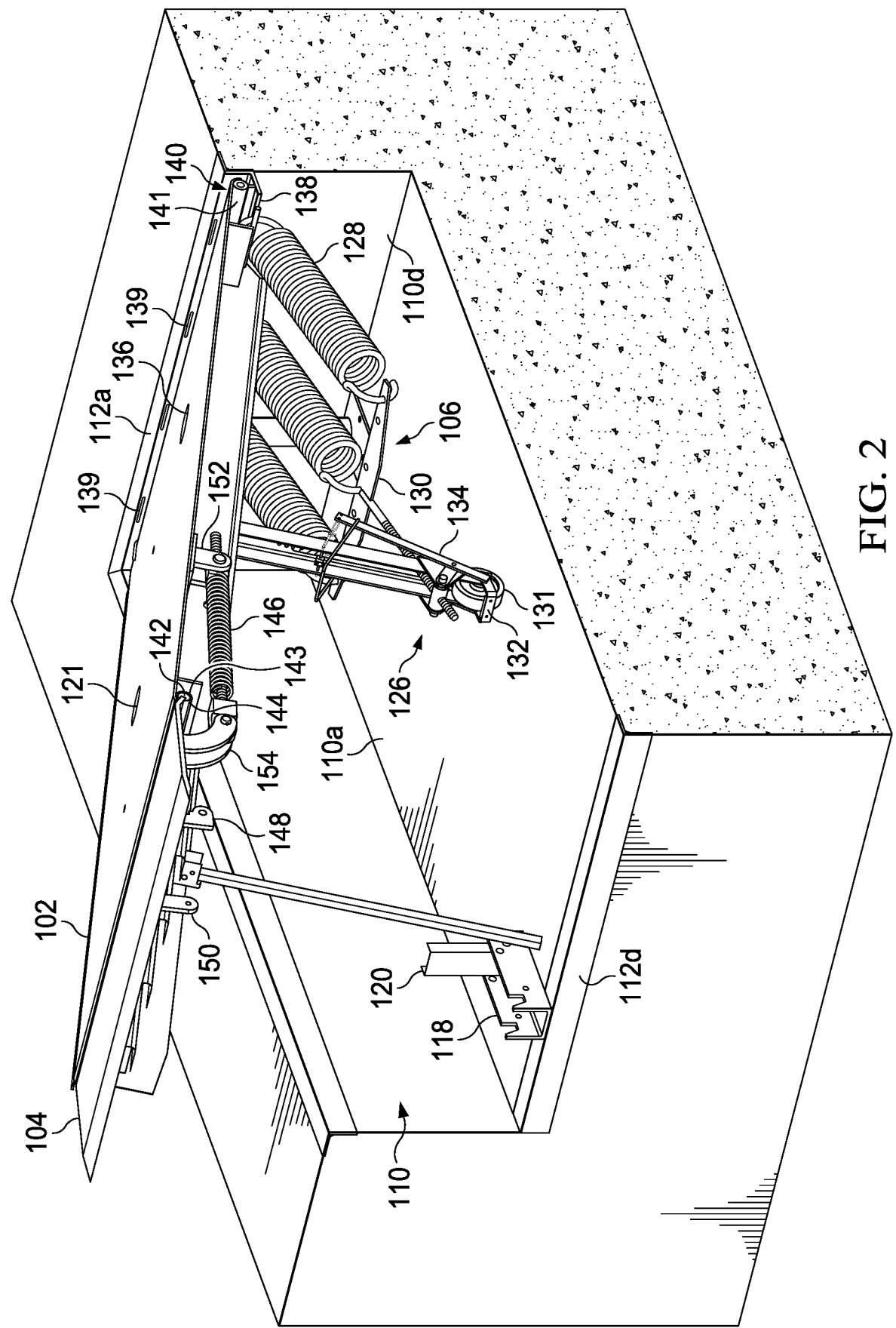
FIG. 2 is a perspective cross section illustration of a dock leveler in raised position and installed in a dock pit of a loading dock, according to one example implementation without the lift arm track.

With initial reference to FIGS. 1 and 2, there are depicted perspective illustrations of a loading dock leveler 100 and its structural components, according to some embodiments of the present disclosure. The loading dock leveler 100, also referred to as a dock leveler 100 herein, includes a deck 102, a lip 104, and a hold down assembly 106. The dock leveler 100 is installed on a loading dock 108 and more specifically within a dock pit 110 formed within the loading dock 108. FIG. 1 illustrates a perspective view of the dock leveler 100 installed in the dock pit 110 of the loading dock 108. FIG. 2 illustrates a perspective cross section view of the dock leveler 100 installed in the dock pit 110 of the loading dock 108. In this implementation, the dock leveler 100 is a pit leveler. The dock leveler 100 has a horizontal stowed position such that in this position, the deck 102 is flush with the top surface of the loading dock 108a. When in operation, the dock leveler 100, the dock leveler 100 can be raised above or lowered below the stowed position.

Typically, the loading dock 108 is constructed of concrete and is large enough to accommodate one or more trailers or trucks side by side. For illustration purposes and ease of discussion, only one dock leveler 100 capable of operating with one trailer or truck is illustrated and described. However, it is understood that the loading dock 108 may include more than one dock pit 110, each including a dock leveler 100 installed therein. Installation and use of the dock leveler 100 with a loading dock 108 constructed of materials other than concrete are contemplated herein and are not excluded by this description. The loading dock 108 has a top surface 108a or floor of the loading dock 108 and a front surface 108b. The dock pit 110 is formed in the loading dock 108, as illustrated in FIGS. 1 and 2. The dock pit 110 has a pit floor or bottom surface 110a that is parallel to the top surface 108a or floor of the loading dock 108, a sidewall 110b that extends perpendicular to the bottom surface 110a, an opposing sidewall 110c that is parallel to sidewall 110b, and a rear wall 110d extending from the sidewall 110b to the sidewall 110c.

Curb angles 112a-112d are coupled to the loading dock 108 and more specifically are located at edge intersections of the dock pit 110 and the loading dock 108 top surface 108a and front surface 108b. In some examples, the curb angles 112a-112d are made of iron, steel, or another metal and are embedded into the loading dock 108 during construction of the loading dock 108. In some implementations, the curb angles 112a-112d provide an anchor point for installing the dock leveler 100 and protect the edges of the dock pit 110 and the loading dock 108. The curb angle 112a is located at the intersection of the top surface 108a of the loading dock 108 and the rear wall 110d of the dock pit 110. The curb angle 112a forms a top rear edge of the dock pit 110 and extends the length of the rear wall 110d. The curb angle 112b extends along the top of sidewall 110b from the rear wall 110d to the front surface 108b of the loading dock 108. The curb angle 112b may be coupled to the curb angle 112a, such as by welding, for example. The curb angle 112c extends along the top of sidewall 110c from the rear wall 110d to the front surface 108b of the loading dock 108. The curb angle 112c may be coupled to the curb angle 112a, such as by welding, for example. The curb angle 112d extends along the front of the dock pit 110, specifically along the front surface 108b of the loading dock 108, from the sidewall 110b to the sidewall 110c.

The dock leveler 100 further includes a toe guard 114 coupled to sidewalls of the deck 102, a maintenance strut 116 coupled to an underside of the deck 102, one or more lip keepers 118 coupled to the bottom 110a of the dock pit 110, and one or more safety legs 120 coupled to each lip keeper 118. The toe guard 114 may be riveted to deck supports 124 to secure the toe guard 114 to the deck 102. The toe guard 114 acts as shield to protect the feet of workers from slipping under the dock leveler 100 and into the dock pit 110. The toe guard 114 also serves to keep trash out of the dock pit 110. The maintenance strut 116 is attached to the underside of the deck 102 and is used to support the entire weight of the dock leveler 100 during maintenance of the dock leveler 100 to provide additional safety when working on or under the dock leveler 100. As illustrated in FIGS. 1 and 2, the dock leveler 100 is in an open or raised position and the maintenance strut 116 is extended.

Each lip keeper 118 is coupled to the dock pit 110 by welding a front edge of the lip keeper 118 to the curb angle 112d at weld point 119. In some embodiments, each lip keeper 118 may additionally be bolted to the bottom 110a of the dock pit 110. In this implementation, a pair of notches 122 is formed in each lip keeper 118 to receive a front edge 104a of lip 104. The lip 104 rests in the lip keeper 118 when the dock leveler 100 is in the closed or stowed position. The safety legs 120 may be spring loaded and biased in the upward extending position, as illustrated. The safety legs 120 ensure that the deck 102 does not drop all the way to the floor 110a of the dock pit 110 when the dock leveler 100 is being lowered. In some implementations, a support-leg chain (not shown) may be used to lower the safety leg 120 thereby allowing the deck 102 to lower below the stowed position to the bottom 110a of the dock pit 110. The support-leg chain may be passed through support-leg chain hole 121 for easier, and safer, access to the support-leg chain. This allows a worker to lower the safety legs 120 and the deck 102. The lip keepers 118 are devoid of connection to the rest of the loading dock 100. In this implementation, the lip keepers 118 are only fixedly attached to the curb angle 112d. In other implementations, the lip keepers 118 may be attached to each other. In this implementation, the lip keepers 118 are fixed in place relative to the pit by being fixed to a curb angle of the pit. However, since the dock leveler is frameless in the implementation shown, there is no frame or structure fixing or securely attaching the lip keepers 118 to the deck or the leg bracket. That is, the lip keepers are devoid of a fixed connection to other components of the dock leveler.

The hold down assembly 106 includes a lift arm assembly 126, one or more deck springs 128, and a spring connector 130 to connect the one or more deck springs 128 to the lift arm assembly 126. The lift arm assembly 126 includes a wheel 131, a brake 132, and a brake arm 134. The wheel 131 is coupled to one end of the lift arm assembly 126 and the other end of the lift arm assembly 126 is coupled to the deck 102 of the dock leveler 100. This configuration allows the wheel 131 to roll along the bottom 110a of the dock pit 110 when the brake 132 is disengaged. The brake 132 is biased to be engaged by the brake arm 134. The brake arm 134 is moved to disengage the brake 132. The wheel 131 is not supported by a frame or track-rather, it runs on pit floor 110a.

The hold down assembly 106, and more specifically the lift arm assembly 126, is centered laterally under the deck 102. That is, the lift arm assembly is between sidewalls 110b and 110c of the dock pit 110. Centering the lift arm assembly 126 under the deck 102 minimizes deck rise imbalances of the deck 102 after repeated use. Deck rise imbalance is a condition where one lateral side of the deck 102 rises above another lateral side of the deck 102 and is caused by repeated use of the dock leveler 100 when a support structure is off center. As loads are moved across the dock leveler 100 a torque is applied around the support structure. The lift arm assembly 126 as disclosed herein avoids this problem by being centered under the deck 102.

The spring connector 130 connects to the lift arm assembly 126 at one end and to the one or more deck springs 128 at the other end. Each of the one or more deck springs 128 connects to the spring connector 130 at one end and to the underside of the deck 102 at the other end. When the deck moves downward, the wheel 131 rolls forward stretching the deck springs 128 and placing them under tension. The brake 132 and the weight of the deck 102 holds the deck springs 128 in tension. When the brake 132 is disengaged, the deck springs 128 pull the lift arm assembly toward the rear wall 110d of the dock pit 110, thereby raising the deck 102. Additionally, the brake 132 is designed to engage quickly, for example using a short throw snubber to reduce the amount of movement of the deck 102. The short throw may mean that the displacement is small. For example, the wheel 131 may roll rearward (e.g., toward rear wall 110d) if the brake 132 does not engage quickly thereby allowing the deck 102 to rise slightly. Reducing this rise increases user safety by keeping the lip 104 firmly on the trailer bed to minimize bumps for forklifts or pallet movers.

In some implementations, a brake actuator (not shown) (e.g., a chain, cable, rope, lever, etc.) may be attached to the brake arm 134 and run through a brake chain hole 136 in the deck 102. When a worker pulls the brake actuator (e.g., chain), the brake chain moves through the brake chain hole 136 thereby moving the brake arm 134 and disengaging the brake 132 allowing the wheel 131 to roll. In this configuration, the worker exerts minimal force to move the brake chain one or two inches thereby disengaging the brake 132. A chain displacement less than about 6-inches is considered a short throw displacement. By contrast, conventional dock levelers require multiple heavy jerks of a chain to free the deck to move up or down and may require pulling a chain 12-inches or more. When the brake 132 is disengaged the deck 102 may move up or down depending on how much weight is on the deck 102. If the deck 102 is empty, or lightly loaded, the deck 102 will move up to a raised position under the spring force when the brake 132 is disengaged. The short throw displacement is a result of a leveraged brake arm 134, requiring physical displacement of the brake pad of less than about 2-inches, and in some implementations, less than about 1-inch.

The dock leveler 100 further includes a leg bracket 138, a deck hinge 140 that couples the deck 102 to the leg bracket 138, and a lip hinge 142 that couples the lip 104 to the deck 102. The leg bracket 138 is installed on the bottom 110a of and against the rear wall 110d of the dock pit 110. In some examples, the leg bracket 138 is secured in place by welding to the curb angle 112a at weld points 139. The leg bracket 138 provides structural support for the dock leveler 100 and will be described in more detail further below. The deck hinge 140 is located at the rear of the deck 102 near the rear wall 110d of the dock pit 110. The rear of the deck 102 is shaped with a downward curve that is fastened to a shaft 141 to form a first part of the deck hinge 140. The shaft 141 is then coupled to the leg bracket 138 as will be illustrated and described further below. Typically, conventional dock levelers utilize a piano style hinge that is supported at only a few points across the width of the dock pit 110. In contrast, the design of the deck hinge 140 supports the deck 102 across the width of the leg bracket 138 providing a hinge that is strong, reliable, and will last longer resulting in less down time for replacement or repair.

The lip hinge 142 is formed by welding the rear of the lip 104 to a key slot within a cylinder 143 (e.g., bar stock). This is then inserted into a shaft 144 that is coupled to a front edge of the deck 102. The shaft 144 has a slot cut out allowing the lip 104 to rotate from one edge of the cut out to the other edge of the cut out without releasing the lip 104. This design allows the lip to shed debris instead of trapping debris resulting in a longer lasting lip hinge 142. Furthermore, the lip hinge 142 is stronger than conventional lip hinges because the weight of the lip 104, and the load thereon, is supported across the width of the lip 104 and deck 102.

In this example, the lip 104 further includes a lip spring 146, a lip chain attachment point 148, and a dampener attachment point 150. The lip spring 146 is coupled to the deck 102 using bracket 152 and to the lip 104 using lip spring connector bracket 154. The lip spring 146 is a compression spring device that holds the lip 104 in a stowed position and moves the lip 104 from a stowed position to a raised position. When the lip is in a stowed position, the lip is vertical and the lip spring 146 has an upward angle toward the lip 104 that creates an inward moment, thereby holding the lip 104 in the stowed position. However, when the deck 102 moves upward under the force of the deck springs 128, the forward momentum of the lip 104 causes the lip spring 146 to angle downward toward the lip 104 that pushes the lip 104 outward and upward into the raised position. The lip spring uses a bracket cam-like action to both bias the lip to the stowed position, and to bias the lip to the raised position. One or more lip chains (not shown) may be connected between the lip chain attachment point 148 one or more of the lip keepers 118 to resist the movement of the lip 104 and cause the lip 104 to move forward. This forward movement engages the lip spring 146. In some embodiments, a one-way dampener may be connected between the dampener attachment point 150 and the underside of the deck 102 to resist the downward movement of the lip 104. The lip 104 is biased to move to the stowed position under its own weight and is resisted by the optional dampener and the lip spring 146. The lip 104 will return to the stowed position unless an obstacle (e.g., a trailer bed) is in the way of the lip 104, keeping it in the raised position.

As illustrated in FIGS. 1 and 2, the dock leveler 100 is an open pit leveler design having a stowed position that is level with the dock floor or top surface 108a. Thus, equipment and dock workers can walk, drive, or otherwise travel laterally across the dock leveler 100 when it is in a stowed position. That is, the deck 102 is flush with the floor 108a in the stowed position. Conventional pit leveler systems use a large frame that is installed in the dock pit 110 for stability and to support the lip keepers. In contrast, the dock leveler 100 disclosed herein has an open pit free from bulky and costly metal frameworks that has several advantages over conventional dock levelers. For example, the dock leveler 100 is easily accessible without the need to maneuver around bulky frameworks in the dock pit 110. As another example, there are fewer parts to attract and retain dirt and debris requiring less cleaning than conventional dock levelers. Additionally, it is easier to clean the dock leveler 100 than conventional systems because there is no framework in the way of remove dirt and debris.

Figure 3:
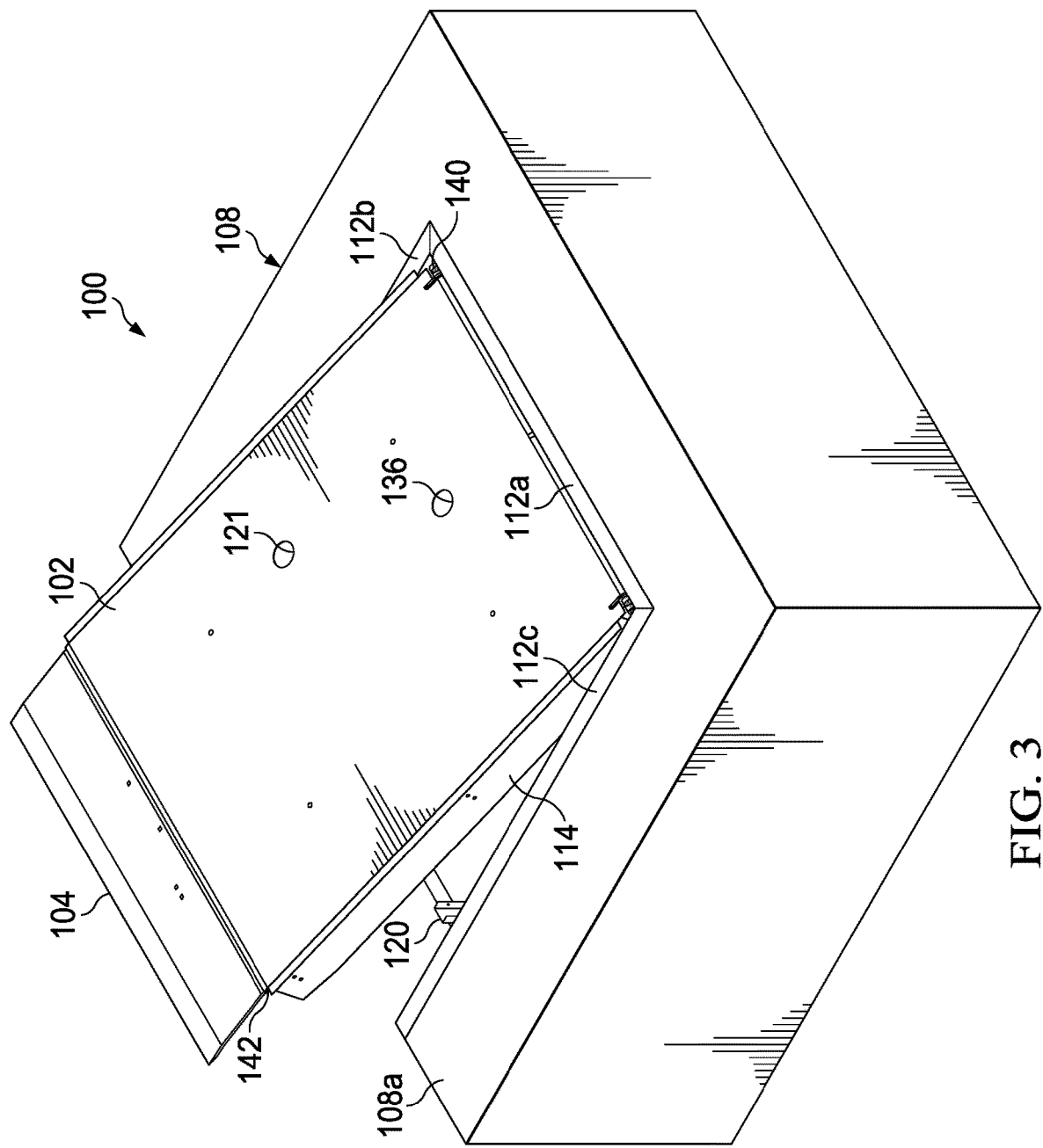
FIG. 3 is a perspective top illustration of a dock leveler in a raised position and installed in a dock pit of a loading dock, according to one example implementation.

With reference to FIG. 3, there is depicted a top perspective view of the dock leveler 100 in a raised position and installed in the dock pit 110 of the loading dock 108. FIG. 3 provides a view of the top surface of the deck 102 including the support-leg chain hole 121 and the brake chain hole 136. As seen from above, the deck 102, including deck hinge 140, abuts the edge of the loading dock 108. Because of the structural arrangement of the deck 102 and hinge 140, there is no need to include a cover plate to bridge the gap between the deck 102 and the loading dock 108 because there is no gap. That is, the deck 102 is disposed directly adjacent the curb angle 112a and the dock floor 108a. Thus, the dock leveler is devoid of a structure, such as a conventional cover plate used to transition from the curb angle 112a to the deck 102. This gapless installation improves the reliability of the dock leveler 100 by reducing the number of potential points of failure. As illustrated, the lip 104 is in the raised position showing the lip hinge 142 extending the width of the deck 102 and the lip 104.

Figure 4:
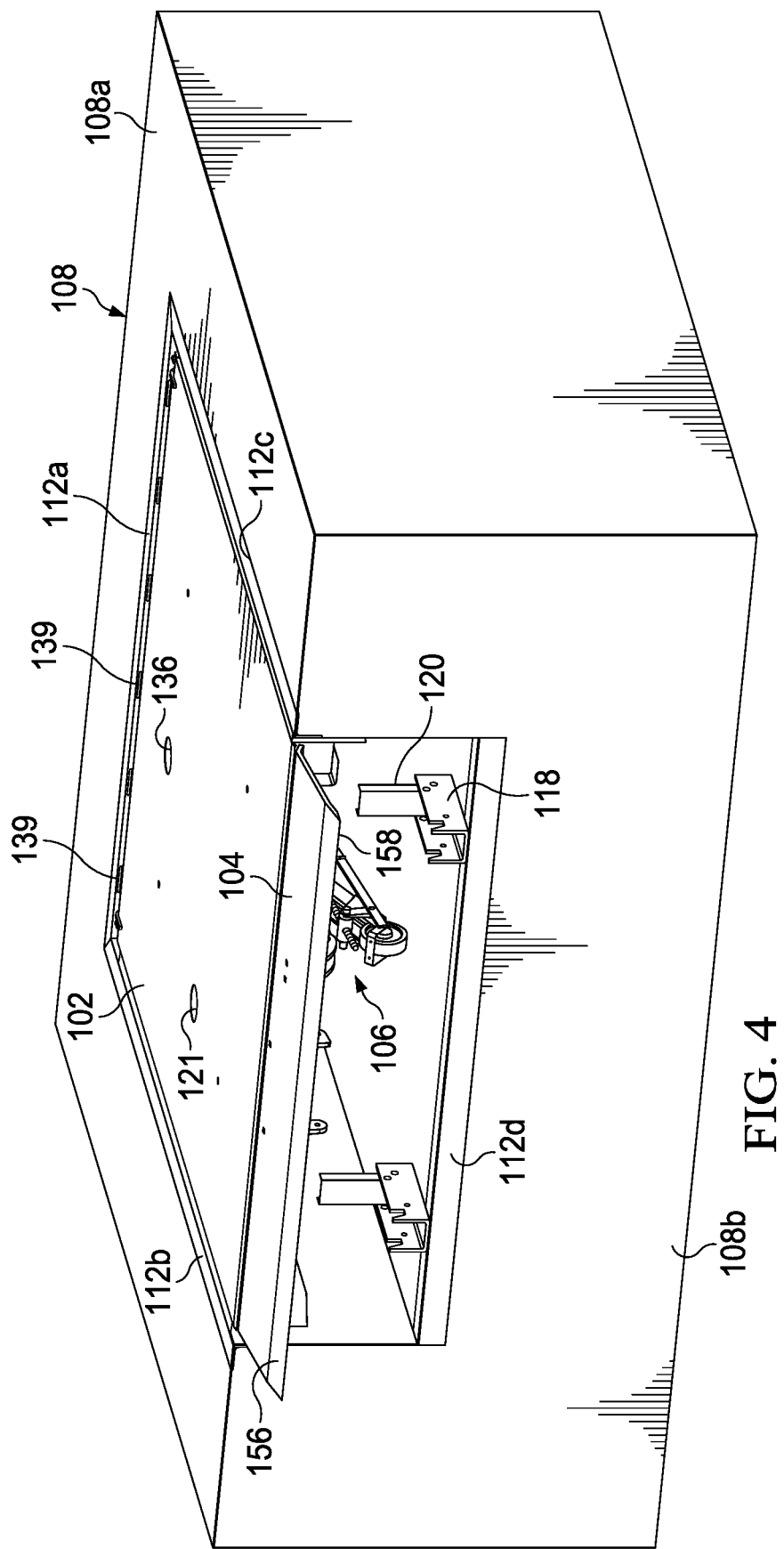
FIG. 4 is a perspective illustration of a dock leveler in a stowed position and installed in a dock pit of a loading dock, according to one example implementation.

With reference to FIG. 4, there is depicted a perspective view of the dock leveler 100 in a raised position with the lip 104 extended and the deck 102 parallel to the top surface 108a of the loading dock 108. The lip 104 includes a transition 156 and a bottom bevel 158 to improve usability and contact with the unloading surface (e.g., trailer bed). The transition 156 of the lip 104 reduces any disturbance caused by moving from the lip 104 to the unloading surface (e.g., trailer bed). The bottom bevel 158 further reduces disturbances in the move from the lip 104 to the unloading surface. The bottom bevel 158 creates a flattened bottom the lip 104 so that the transition terminates at a point and thereby realizing maximum reduction in disturbances when moving from the dock leveler 100 (e.g., the lip 104) to the unloading surface. The bottom bevel 158 has a longitudinal width and a lateral length that extends from one side to the other to create a two-dimensional area that may abut against or lie against a loading bed, such as truck bed. This contrasts conventional upper bevels on a top of the lip, which may result in the lip engaging the truck bed along a bottom line instead of a bottom area. This may ease and smooth travel between the truck bed and the lip 104 and dock leveler 100. The larger surface area of the bottom-beveled lip increases the touch area on the trailer bed which may also reduce torsional stresses on deck as traffic passes over the lip. This may increase the longevity of the dock leveler. In addition, the top surface of the deck may include a traction pattern, such as formed features or applied features that may increase frictional engagement of equipment passing over the lip. When using a bottom bevel as disclosed herein, the traction pattern may be consistent on the surface opposite the bottom bevel, allowing better traction of equipment driving over the lip. Some non-limiting examples of a traction pattern that may extend to the edge of the lip on the upper surface include textured formations such as diamond tread or diamond plating, diagonal bumps, traction grating, perforations, or other anti-skid formations.

Figure 5:
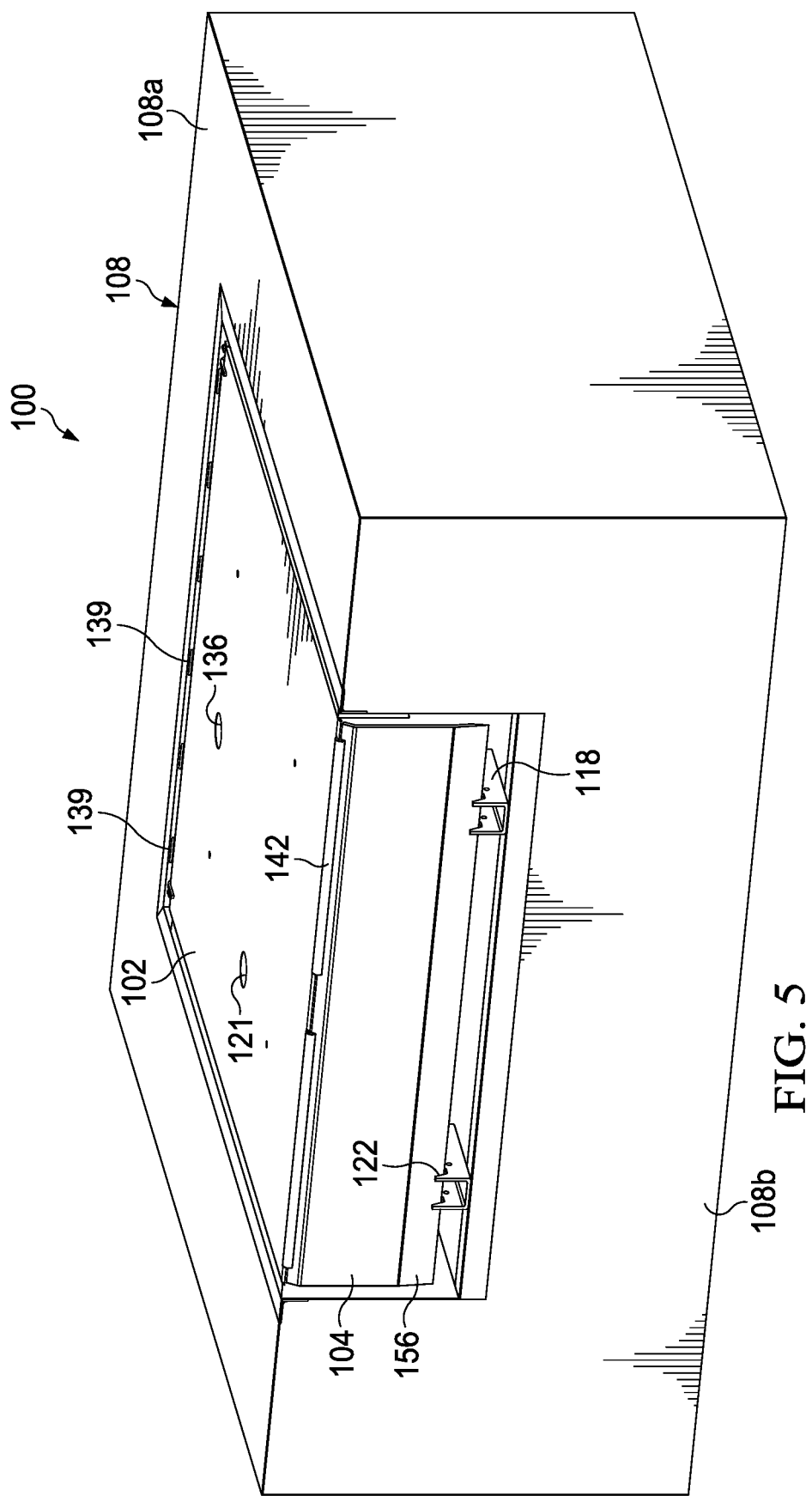
FIG. 5 is a perspective illustration of a dock leveler in the stowed position and installed in a dock pit of a loading dock, according to one example implementation.
Figure 6:
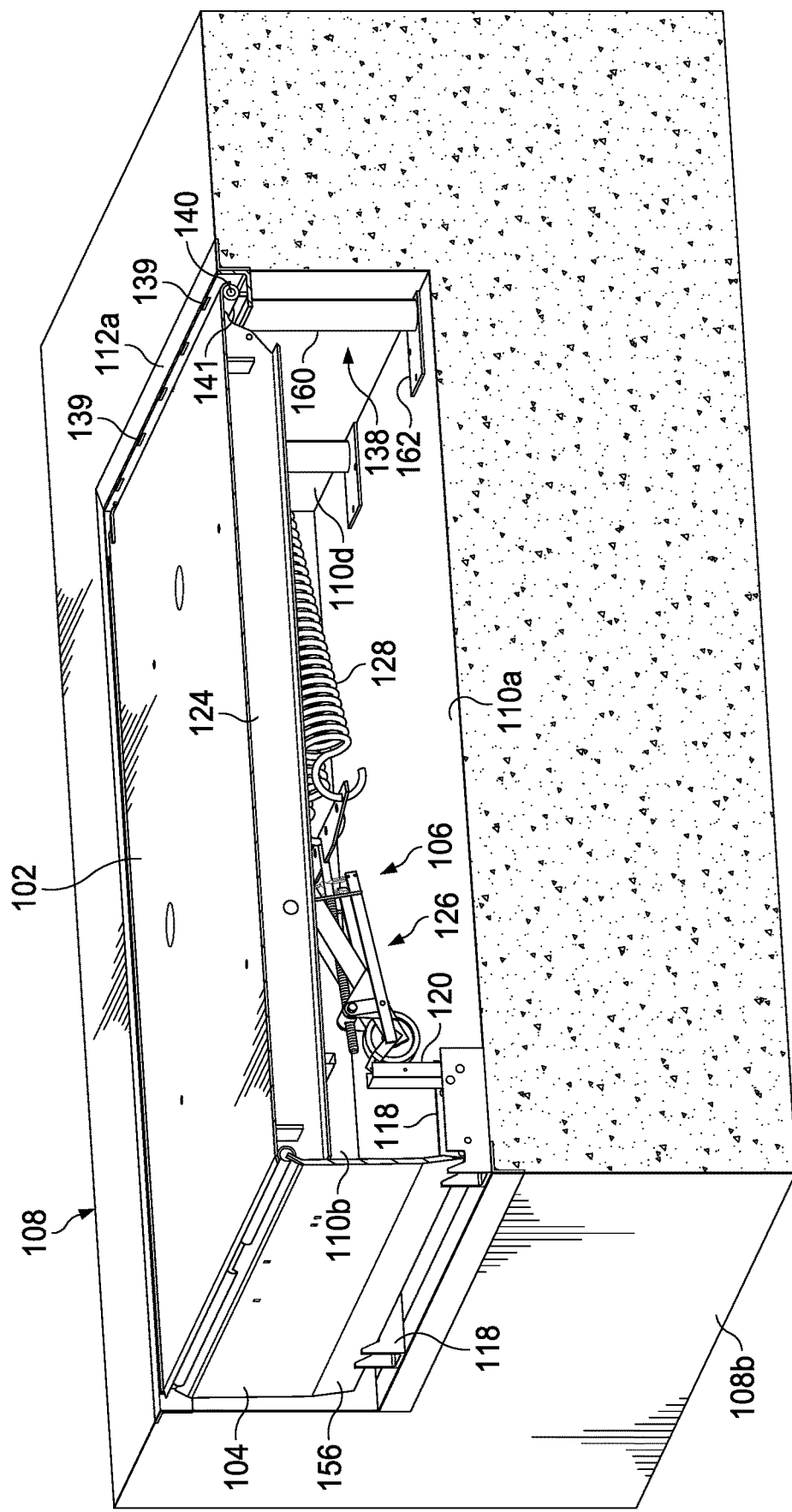
FIG. 6 is a perspective cross section illustration of a dock leveler in a stowed position and installed in a dock pit of a loading dock, according to one example implementation.

With reference to FIGS. 5 and 6, there are depicted perspective and perspective cross section views of the dock leveler 100 in the stowed position with the lip 104 resting in the lip keeper 118. As previously mentioned, the lip keepers 118 are designed to hold the lip 104, and more specifically the transition 156 (e.g., edge) of the lip 104. The pair of notches 122 are designed to hold the lip 104 in place and do not allow the lip 104 to move inward (e.g., into the dock pit 110) or outward (e.g., away from the loading dock). This design provides added security to the loading dock 108 area. When installed, there may be walls installed adjacent to dock pit 110 and the dock leveler 100 with an opening for a rolling door to open and close over the dock leveler 100. The dock leveler 100, when in the close position, is designed to function as a door when the rolling door is stowed and provides added security to the building (e.g., warehouse) in which the dock leveler is installed.

With reference to FIGS. 6-11, there are depicted perspective and cross section views of structural and mechanical components of the dock leveler 100.

FIG. 6 illustrates the hold down assembly 106 when the dock leveler 100 is in the stowed position. The deck springs 128 are under tension and the lift arm assembly 126 is extended with the brake 132 engaged. Also illustrated are the legs 160 and the feet 162 of the leg bracket 138. Each foot 162 of the leg bracket 138 is bolted into the dock pit 110 and each leg 160 is placed directly adjacent the rear wall 110d of the dock pit 110. This provides added structural support for the dock leveler 100, and more specifically the deck 102.

Figure 7:
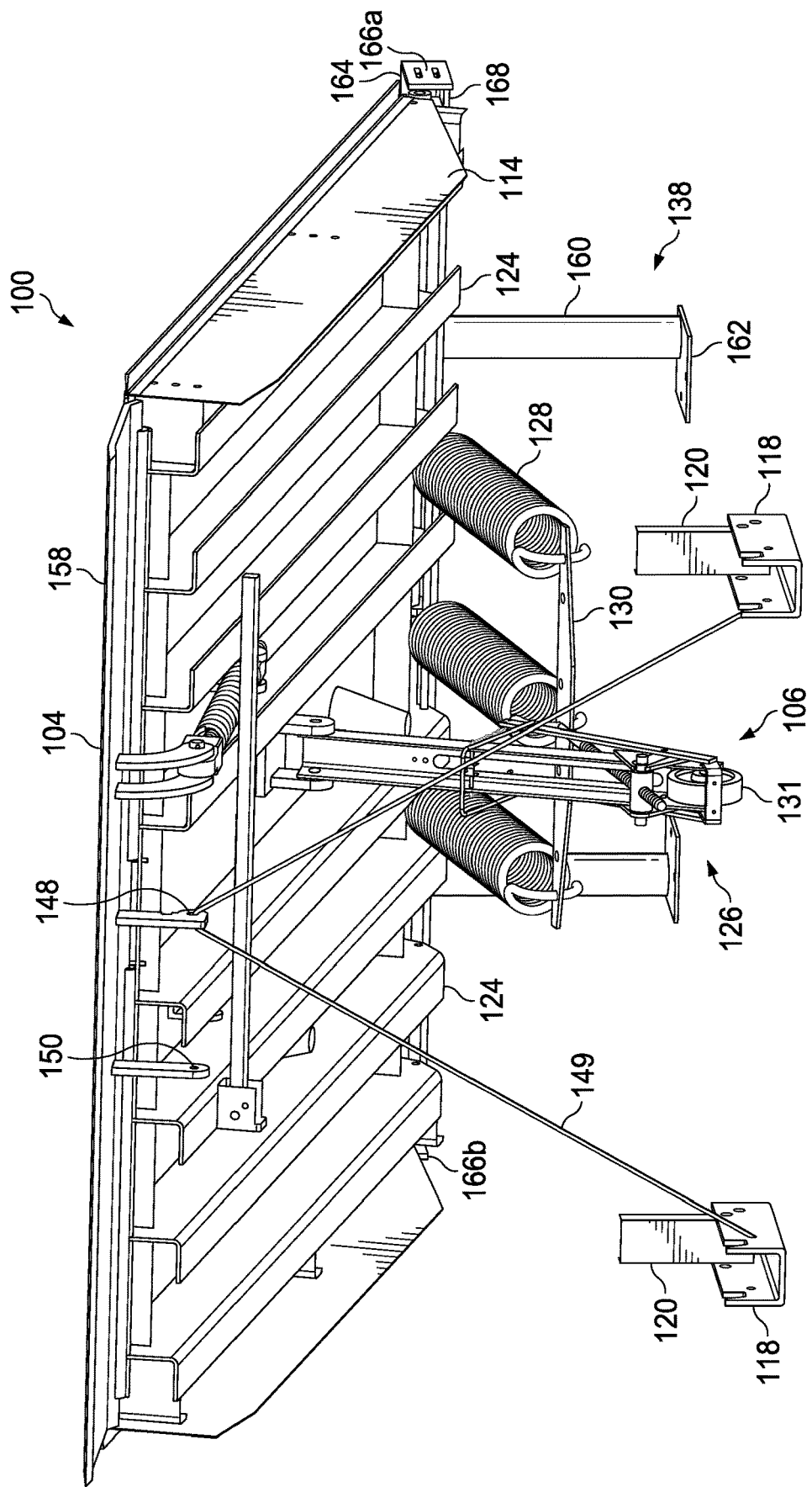
FIG. 7 is a perspective illustration of material structural components of a dock leveler, according to one example implementation.

FIG. 7 depicts a perspective view of the components of the dock leveler 100 without the loading dock 108. The dock leveler 100 is in a raised position with the lip 104 in the raised position. The lip chain 149 connected to the lip 104 via the lip chain attachment point 148. The lip chain 149 passes through the lip chain attachment point 148 with one end of the lip chain 149 attached to one lip keeper 118 and the other end attached to the other lip keeper 118. In the example position shown, the lip chain 149 is taut, which pushes the lip 104 forward and that assists with engaging the lip spring 146.

Figure 8:
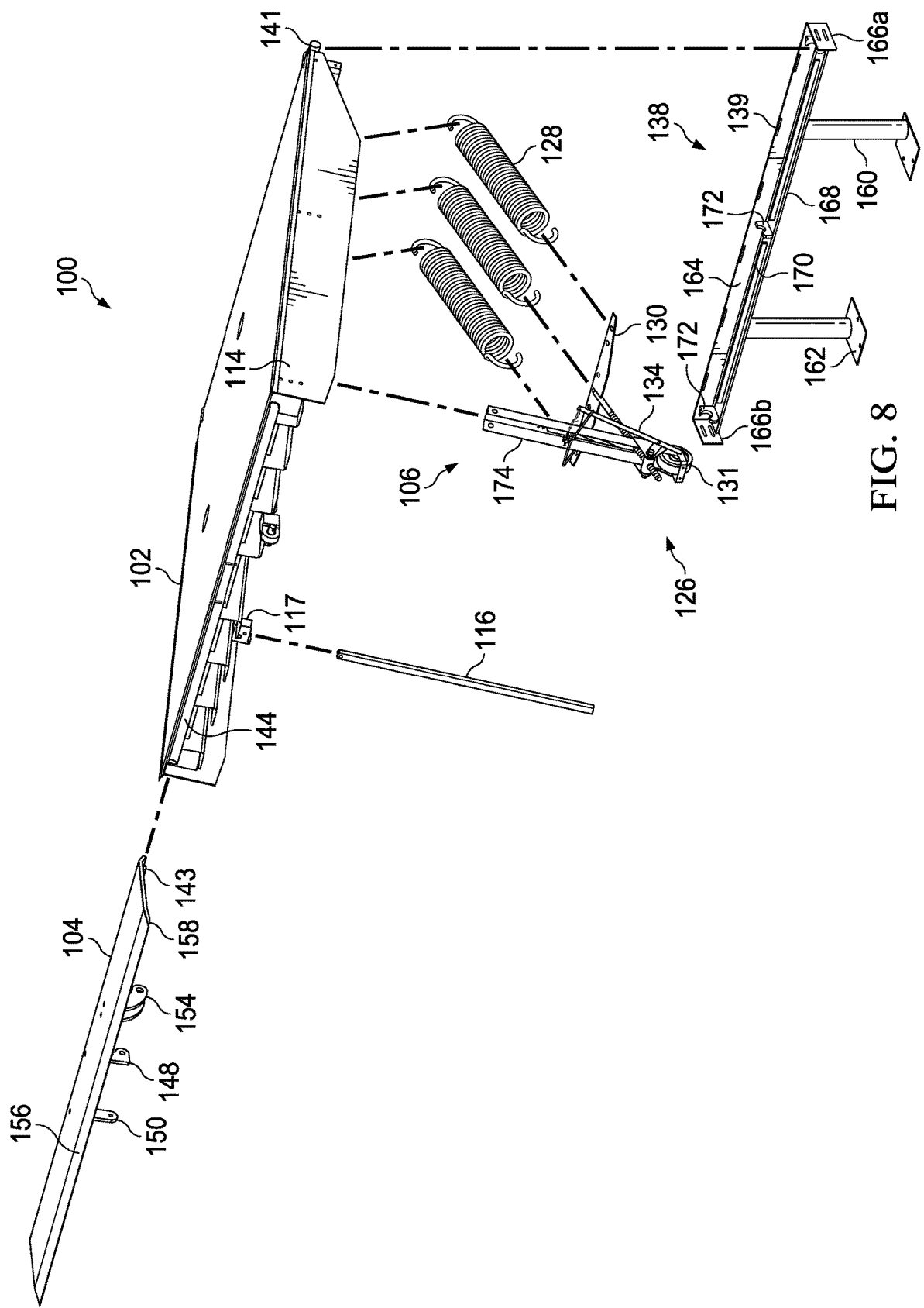
FIG. 8 is an exploded perspective illustration of material structural components of a dock leveler, according to one example implementation.

FIG. 8 depicts an exploded perspective view of the major components of the dock leveler 100, including the connections of the various components. The lip hinge 142 is formed by inserting the cylinder 143 that is coupled to the rear edge of the lip 104 into the shaft 144 that is coupled to the front edge of the deck 102. The lip 104, specifically the cylinder 143, slides through the shaft 144 to form the lip hinge 142. The maintenance strut 116 is connected to the underside of the deck 102 using a connecting bracket 117. The hold down assembly 106 is formed attaching a top portion of the lift arm assembly 126 to the underside of the deck 102. The lift arm assembly 126 includes a lift arm 174, the wheel 131, the brake 132, the brake arms 134, the spring connector 130 and the deck springs 128. A top portion of the lift arm 174 is coupled to the underside of the deck 102 and the spring connector 130 is coupled to a bottom portion of the lift arm 174. The deck springs 128 are coupled to the to the spring connector 130 using a hook at one end of each deck spring 128. A hook at the opposite end of each deck spring 128 is attached to the underside of the deck 102. The deck is then coupled to the leg bracket 138 to form the deck hinge 140. The shaft 141 is inserted into the C-brackets 172. Further details of the installation of the dock leveler 100 will be provided further below.

Figure 9:
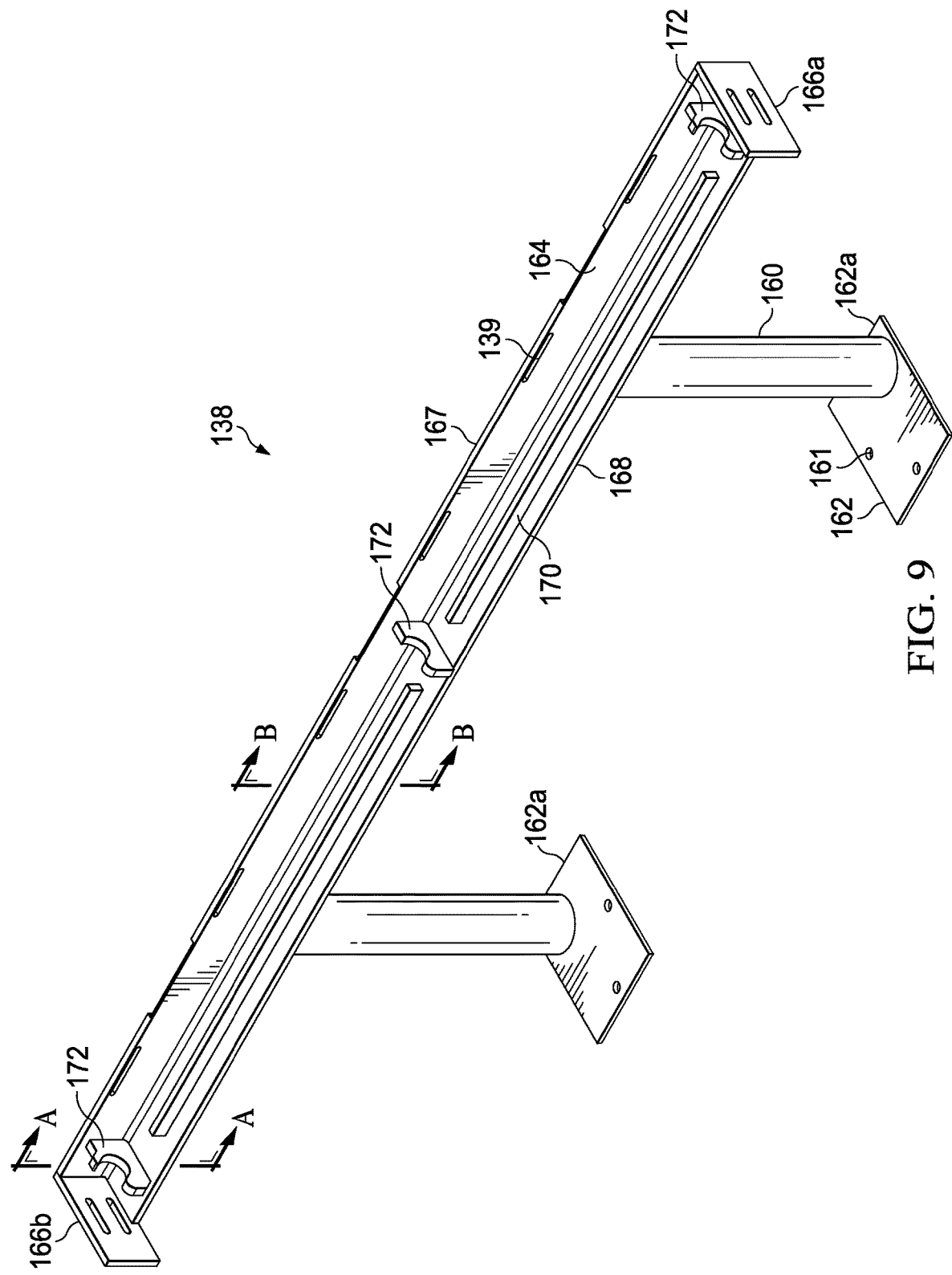
FIG. 9 is a perspective illustration of leg bracket of a dock leveler, according to one example implementation.
Figure 11:
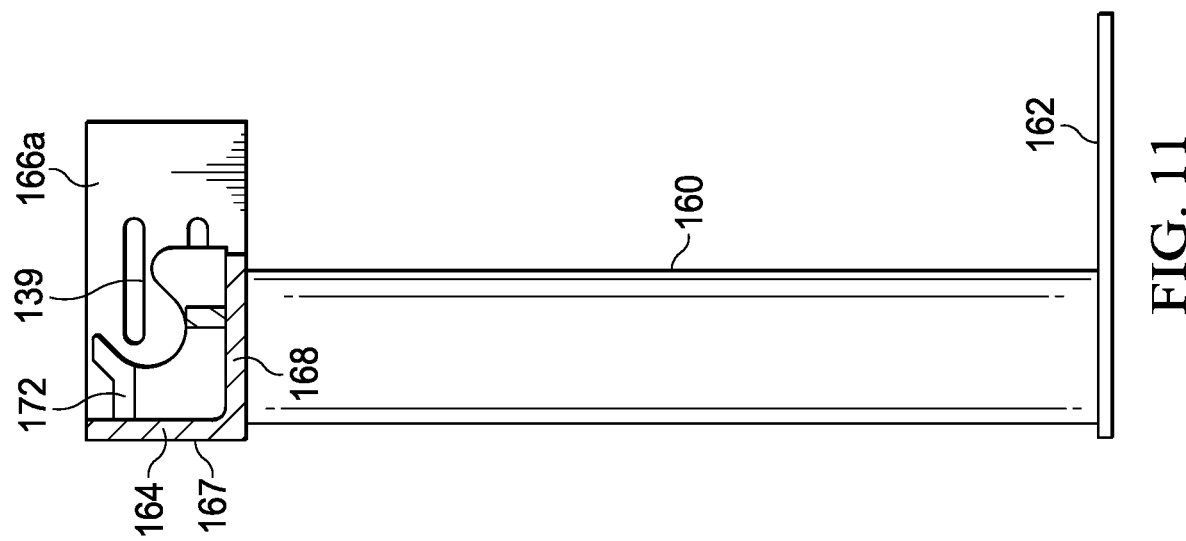
FIG. 11 is a cross section illustration of a leg bracket of a dock leveler, according to one example implementation.`
Figure 10:
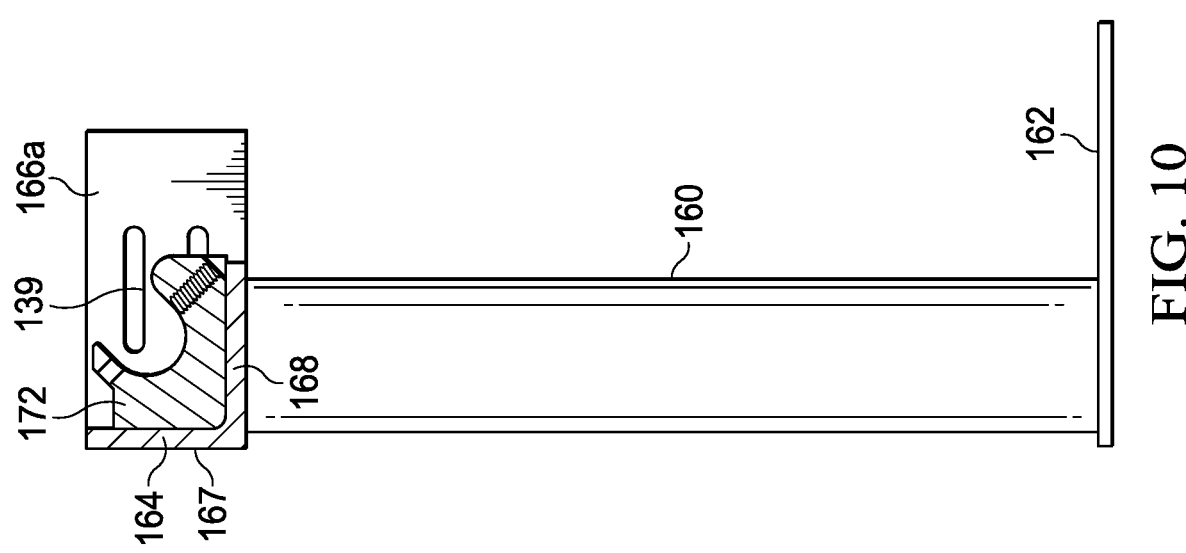
FIG. 10 is a cross section illustration of a leg bracket of a dock leveler, according to one example implementation.

FIG. 9 depicts a perspective view of the leg bracket 138. FIG. 10 depicts a cross section view of the leg bracket 138 through the line A-A in FIG. 9, which passes through a C-bracket 172 on one end of the leg bracket 138. FIG. 11 depicts a cross section view of the leg bracket 138 through the line B-B in FIG. 9, which passes through a region of the leg bracket 138 that does not have a C-bracket 172 or a leg 160.

The leg bracket 138 includes two or more legs 160, two or more feet 162, a rear plate 164, two side plates 166a and 166b, a bottom plate 168, a stock plate 170, and C-brackets 172. Each foot 162 is bolted to the bottom 110a of the dock pit 110 through holes 161. An edge 162a of the foot 162 is disposed directly adjacent the rear wall 110d of the dock pit 110. A leg 160 is attached the foot 162, extending vertically from the foot 162 and away from the bottom 110a of the dock pit 110. An edge of the leg 160 is disposed directly adjacent the rear wall 110d of the dock pit 110. While two legs 160 are depicted, more than two legs 160 may be used and still be within the scope of this disclosure. For example, some implementations use three, four, or five legs 160. In some implementations, the leg bracket 138 has a connector bar adjacent the legs. Deck joint bracket 167 is coupled to the top portion of each leg. The deck joint bracket 167 includes a bottom plate 168, stock plates 170, rear plate 164, side plates 166, and C-brackets 172. A bottom plate 168 is coupled to a top portion of each leg 160. The bottom plate 168 may be welded to the legs 160. The bottom plate 168 may be fastened to the legs 160 using bolts or other means. External supports 170, shown as plates, are coupled to the bottom plate 168 to improve the rigidity and strength of the bottom plate 168. These may support and be disposed directly under and interface with the dock hinge to properly distribute support for loads or the loading dock 100. A rear plate 164 is coupled (e.g., welded, bolted, etc.) to the bottom plate 168 and is configured to be positioned directly adjacent the rear wall 110d of the dock pit 110. The rear plate 164 includes weld points 139 (e.g., holes, openings, etc.) to weld the rear plate 164 to the curb angle 112a. Side plates 166a and 166b are coupled (e.g., welded, bolted, etc.) to the rear plate 164 and the bottom plate 168. Each side plate 166a and 166b includes weld points 139 (e.g., holes, openings, etc.) to weld the side plates 166a and 166b to curb angles 112c and 112b, respectively. Therefore, when the deck 102 is connected to the leg bracket 138, the end of the deck is disposed directly adjacent the dock 108, with only the deck joint bracket 167 and the curb angle 112a disposed between the deck 102 and the dock 108. Unlike conventional dock levelers, the deck 102 of the dock leveler 100 is disposed close enough to the dock 108 that it does not require a plate to bridge the gap between the deck 102 and the dock 108.

The brackets (also referred to in this example as "C-brackets") 172 are coupled (e.g., welded) to the bottom plate 168 and the rear plate 164. The C-brackets 172 are configured to form a portion of the deck hinge 140. In the depicted embodiment, the center C-bracket 172 includes a semi-circular opening that is opening upward and away from the bottom plate 168. The C-brackets 172 on either end of the leg bracket 138 include semi-circular openings that open away from a corner defined by the junction of the bottom plate 168 and the rear plate 164. This configuration allows the deck 102, and more specifically the shaft 141 coupled to the deck 102, to slide into the C-brackets 172 with minimal effort while maintaining the coupling between the shaft 141 and the C-brackets 172 to form the deck hinge 140. The C-brackets 172 on either end of the leg bracket 138 contain a set bolt 182. The set bolt 182 may be tightened when the deck hinge 140 is inserted.

The configuration of the leg bracket 138 as described herein provides several advantages over conventional dock levelers. Using the leg bracket 138 eliminates a large amount of material that is typically used to form the frame of conventional dock levelers. This lowers the weight of the dock leveler 100 and may lower costs of the initial installation and any subsequent maintenance. The joint bracket 167 of the leg bracket 138 is welded directly to the curb angle 112 (e.g., 112a, 112b, and 112c) providing a very secure support for the critical junction between the deck 102 and the loading dock 108. The legs 160 are installed directly beneath the joint bracket 167, reducing movement and stress at the critical junction between the deck 102 and the loading dock 108 that frequently breaks in conventional dock levelers. The deck 102 is secured to the leg bracket 138 using deck hinge 140 that is formed by the deck 102 and the leg bracket 138. Furthermore, because the joint bracket 167 is disposed directly above the legs, the weight of the deck and loads on the deck are carried by the legs in direct compression. Thus, the weight of the deck 102 is fully supported by the legs 160 as opposed to being mounted to the sides of the legs as is done in conventional dock levelers. This configuration improves the overall strength and reliability of the dock leveler 100.

Figure 12:
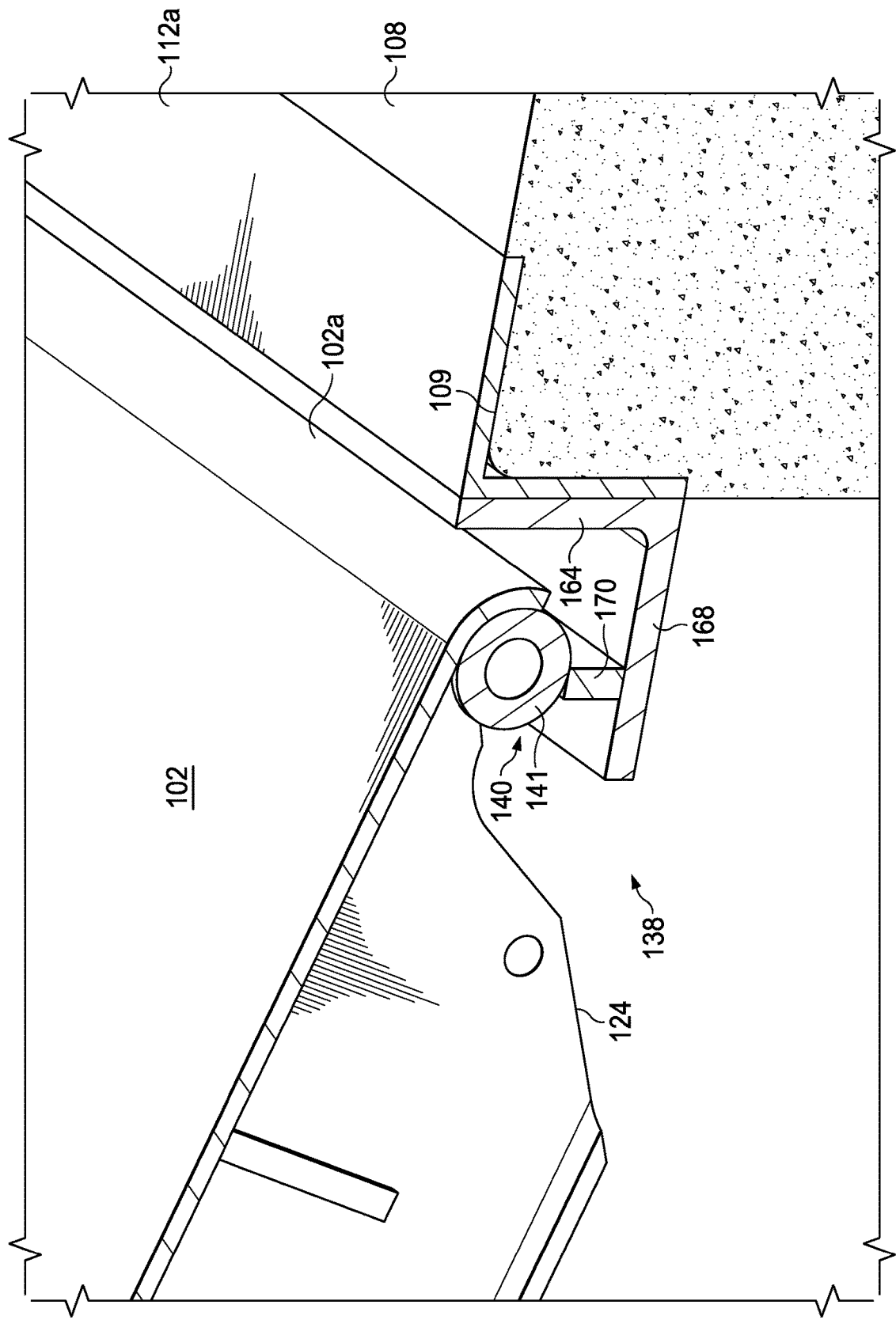
FIG. 12 is a perspective cross section illustration of a deck hinge of a dock leveler, according to one example implementation.
Figure 13:
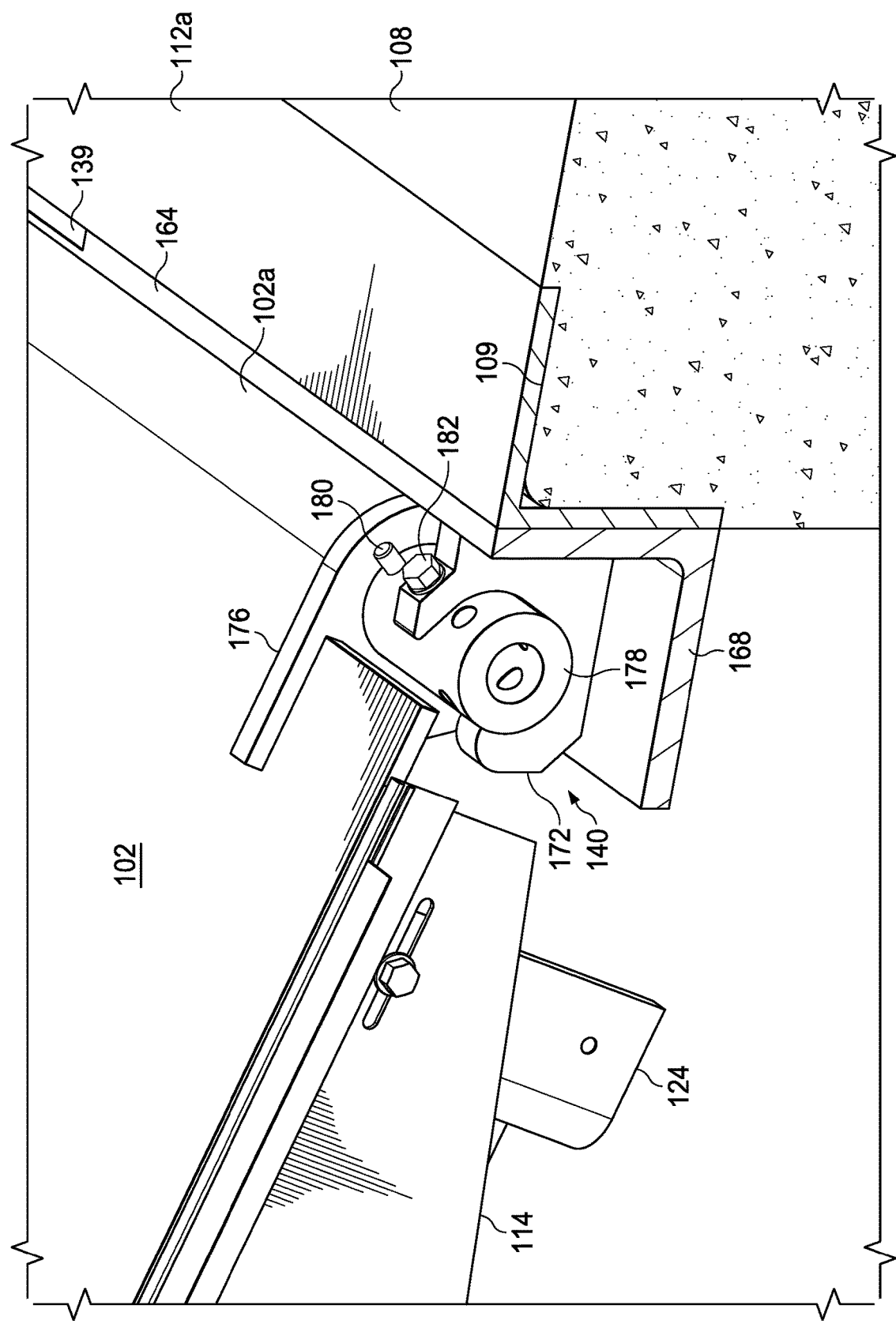
FIG. 13 is a perspective cross section illustration of a deck hinge of a dock leveler, according to one example implementation.

With reference to FIG. 12 depicts a perspective view of the deck hinge 140 of the dock leveler 100. FIG. 13 depicts a cross section of the deck hinge 140. The loading dock 108 includes cut outs 109 for installing the curb angle 112a. The deck 102 is coupled to and supported by the leg bracket 138 to form the deck hinge 140. The deck 102 includes a rear portion 102a that is curved or bent. The rear portion 102a is disposed around the shaft 141 such that it can rotate around the shaft 141. Since the deck 102 is shaped with a curve concentric with the shaft 141, rotation of the deck hinge 140 does not change the distance between the deck 102 and the bracket 164, and thus the curb angles and the dock floor 108a, as the deck 102 rises or lowers. The shaft 141 is held in place from lateral displacement (to front or rear of the pit 110) by the C-brackets 172. The weight of the deck 102 and load is supported by C-brackets 172 and stock plates 170. The stock plate 170 may be a rectangular length of steel. This configuration provides increased strength and durability to the deck hinge 140 as compared to conventional hinge types because the deck 102 is in contact with the leg bracket 138 along the entire length of the leg bracket 138.

In some embodiments, as shown in FIG. 13, portions of the rear portion 102a are removed at the edges of the deck 102 to accommodate the C-bracket 172 and securing mechanisms. An end bracket 176 is placed at the edges of the deck 102 to provide support and stability for the deck 102 to compensate for the removed rear portion 102a. The end bracket 176 is fixed, such as by welding, to the deck 102. The end 178 of the shaft 141 fits through openings in the end bracket 176. The end 178 of the shaft 141 has a plurality of holes and fits into the C-bracket 172. In the example shown, a set rod 180 is inserted into a hole of the end 178 of the shaft 141. The set rod 180 may prevent the deck 102 and the end bracket 176 from moving laterally side-to-side. A set bolt 182 is inserted into the C-bracket 172 and through a hole in the end 178 of the shaft 141. In some embodiments, the set bolt 182 may extend across the diameter of the shaft 141 and may screw into or otherwise be introduced into a hole in the opposing side of the C-bracket. The set bolt 182 is tightened to prevent movement of the shaft 141 relative to the C-bracket 172 and therefore, the leg support. When the deck 102 rotates, the curved rear end 102a and the end brackets 176 rotate around the shaft 141, and the deck is held in a place allowing rotation by the end bracket 176.

Figure 14:
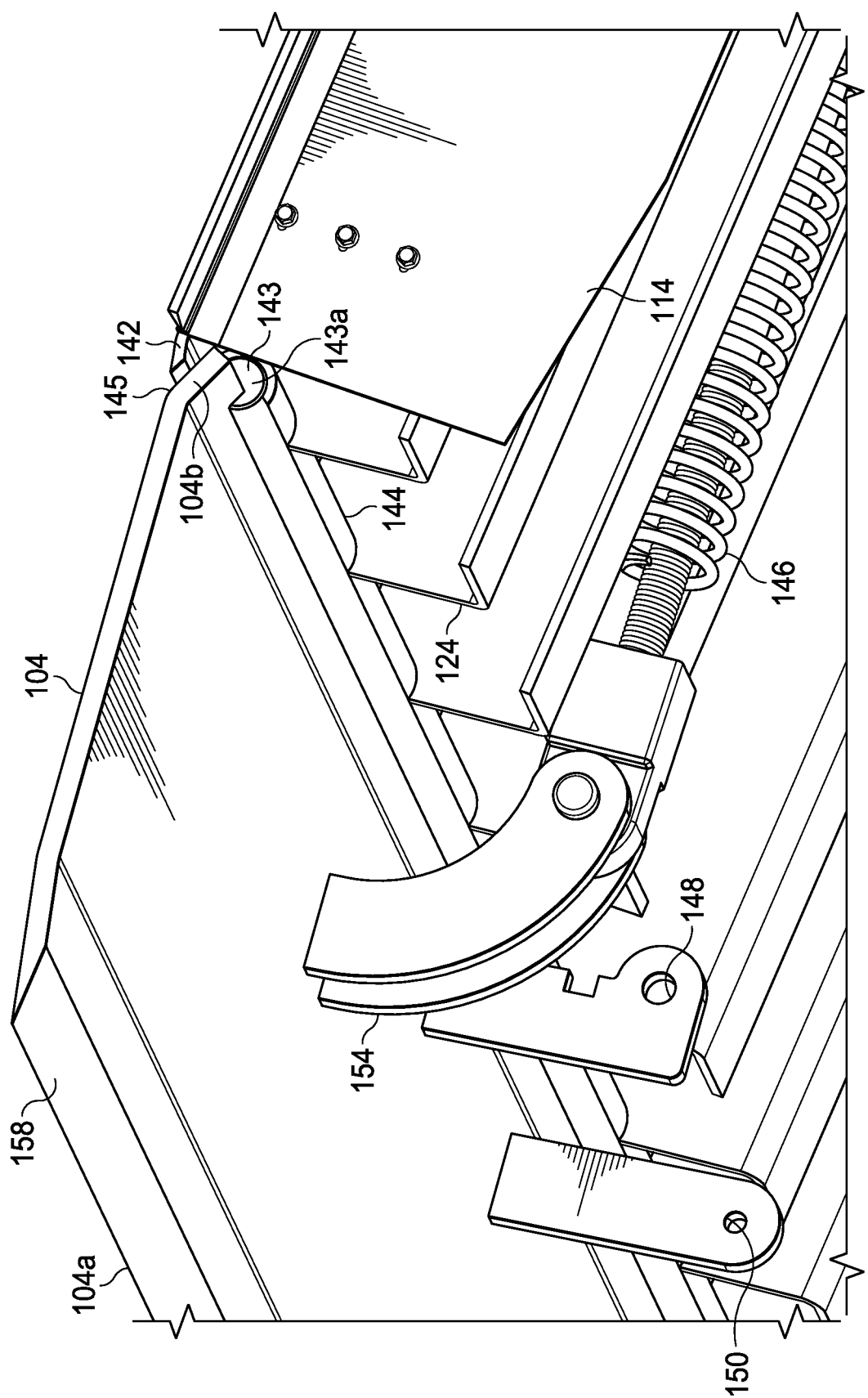
FIG. 14 is a perspective illustration of a lip and lip hinge of a dock leveler, according to one example implementation.
Figure 15:
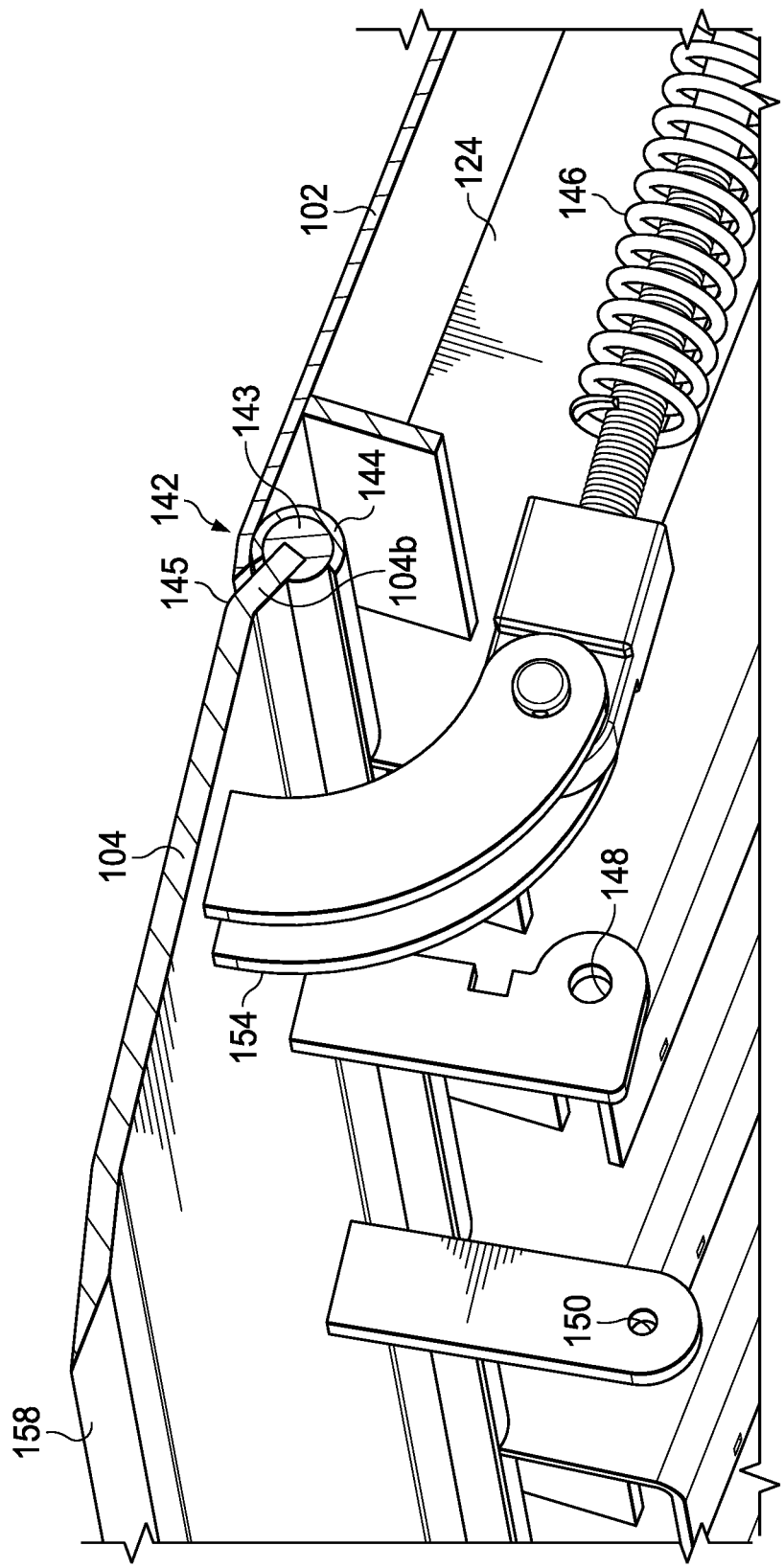
FIG. 15 is a perspective cross section illustration of a lip and lip hinge of a dock leveler, according to one example implementation.
Figure 16:
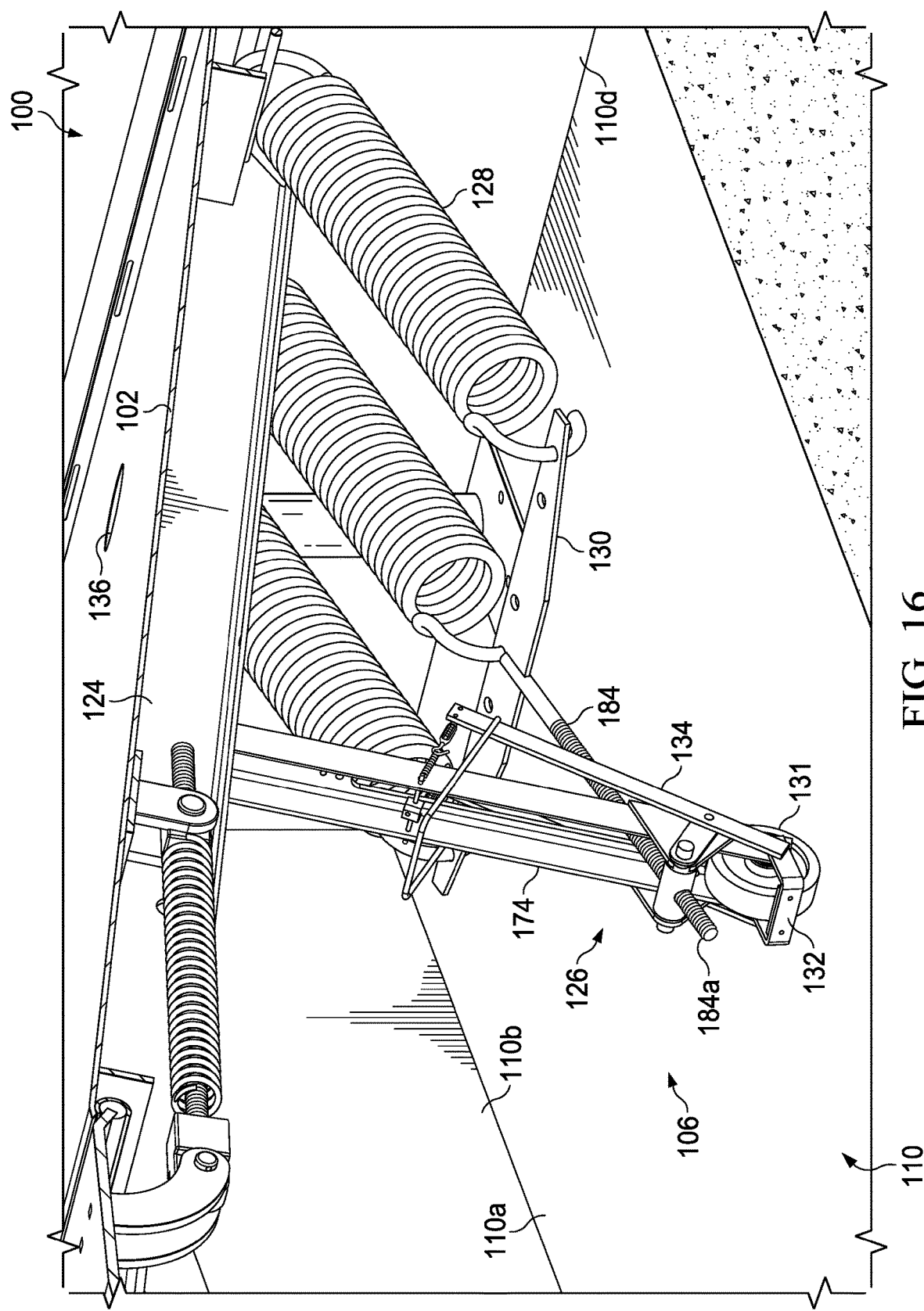
FIG. 16 is a perspective illustration of material structural components of a hold down assembly of a dock leveler, according to one example implementation.
Figure 17:
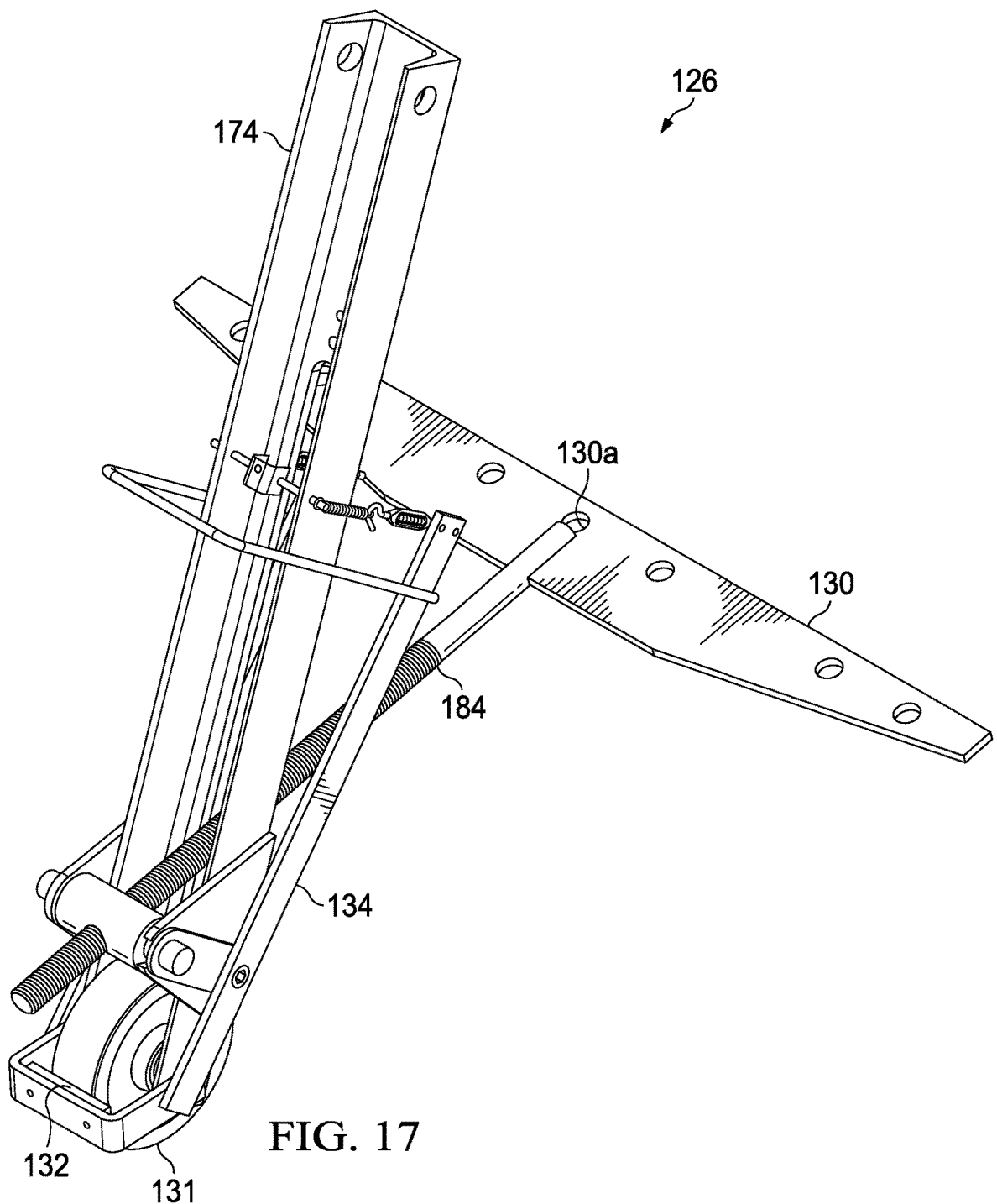
FIG. 17 is a perspective illustration of material structural components of a lift arm assembly of a dock leveler, according to one example implementation.
Figure 18:
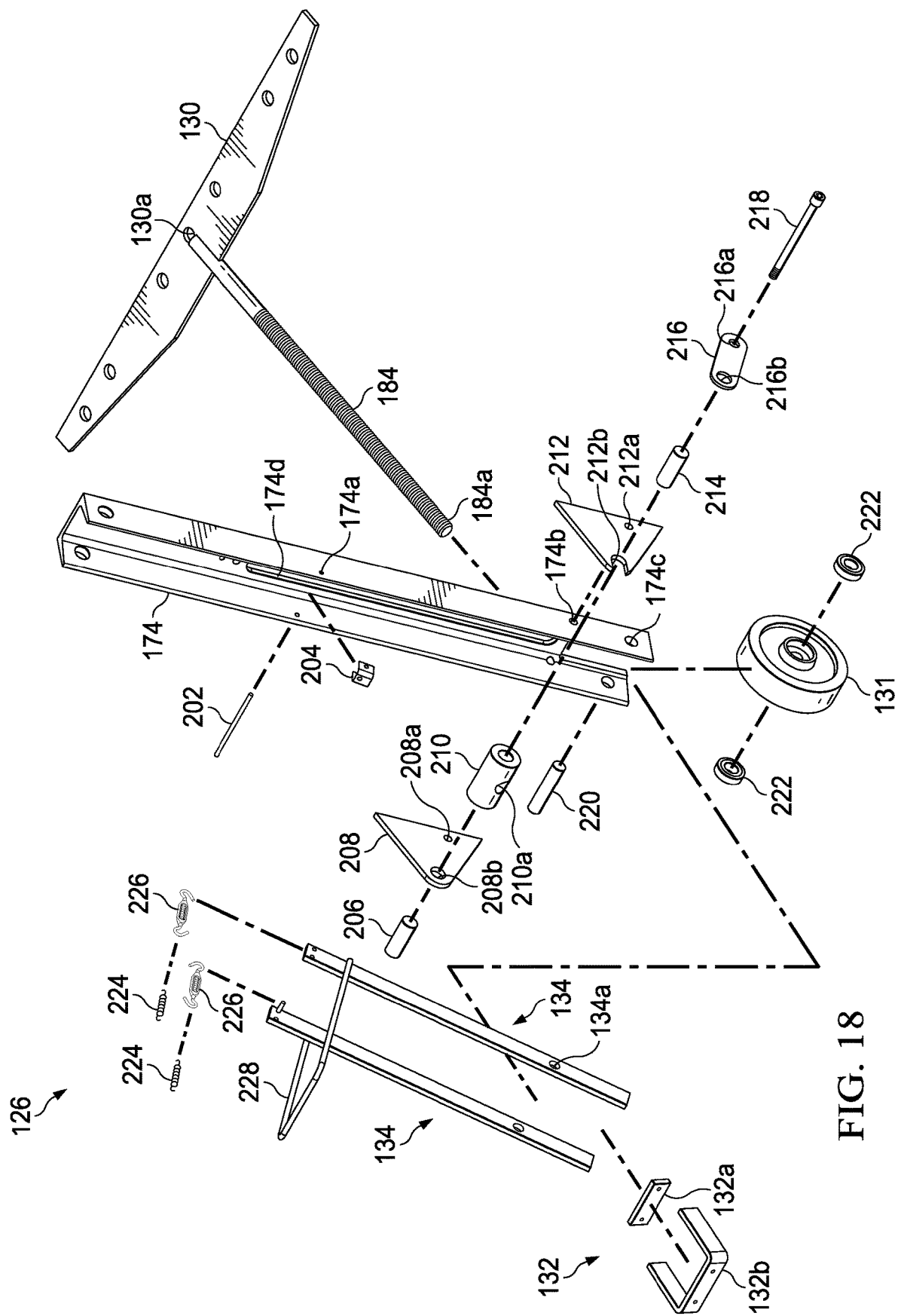
FIG. 18 is an exploded perspective illustration of lift arm assembly components of a dock leveler, according to one example implementation.

FIGS. 14 and 15 depict perspective and perspective cross section views of the lip 104 and the lip hinge 142. The lip bevel 158 is illustrated at the front edge 104a of the lip 104 having been flattened to provide better contact with the unloading surface (e.g., trailer bed) because of the increased surface area of the lip 104 that is contacting the unloading surface. The lip bevel 158 provides improved safety and comfort as the lip 104 is less likely to bump, rise, and/or slide as workers (e.g., forklift, pallet jack, etc.) move across the lip 104 and the dock leveler 100.

The lip hinge 142 includes a rear portion 104b of the lip 104, the cylinder 143, and the shaft 144. The cylinder 143 includes a slot 143a, or keyed slot, that extends the length of the cylinder 143. The rear portion 104b of the lip 104 slides or is press fit into the slot 143a. The fit of the lip 104 in the slot 143a may be sufficient to hold the lip 104 in the slot 143a. In some examples, the lip 104 and more specifically the rear portion 104b may be welded or otherwise secured into the slot 143a. The combination of the lip 104 and the cylinder 143 with the shaft 144 form the lip hinge 140. The cylinder 143 slides into the shaft 144 with the lip 104 sliding through an opening formed in the shaft 144. The opening in the shaft 144 allows the lip 104 to rotate up and down freely. Forming the lip hinge 142 in this manner improves the structural integrity of the lip hinge 142 and reduces, or eliminates, problems from debris entering the lip hinge 142.

The front edge of the deck 102 is bent slightly downward such that it extends over the lip hinge 142 and the rear portion 104b of the lip 104. When the lip 104 is raised, the front edge of the deck 102 and the lip 104 meet to form a debris crevice 145. In this embodiment, there may be a small gap between the front edge of the deck 102 and the lip 104 within the debris crevice 145. During operation of the dock leveler 100 when the lip 104 is in a raised position, debris may pile up within the debris crevice 145. When the lip 104 is in the stowed position such that the lip 104 is vertical, the debris falls out of the debris crevice 145.

The lip spring connector bracket 154 is coupled to the underside of the lip 104. The lip spring connector bracket 154 has a quarter circle shape with one end coupled to the lip 104 and the other end configured to receive and be coupled to the lip spring 146. As illustrated, the lip spring connector bracket 154 includes two parallel pieces. Other configurations are contemplated. One end of the lip spring 146 is coupled to the lip spring connector bracket 154 through the use of bolts, welding, or other means. This coupling allows the lip spring connector bracket 154 to push and pull and the lip spring 146 and the lip spring 146 to push and pull the lip spring connector bracket 154. When the dock leveler 100 is raised (e.g., moved upward) the momentum causes the lip 104 to swing to a raised position causing the lip spring connector bracket 154 to pull the lip spring 146. After this initial pull, the lip spring 146 pushes the lip spring connector bracket 154 causing the lip 104 to rise into a raised position. In some embodiments, one or more lip chains may be attached to the lip chain attachment point 148 and provide some or all the initial force to move the lip 104 when the lip chains are pulled taught.

When in the raised position, the lip 104 begins to move downward under its own weight through gravitational force. The lip spring 146 resists this downward motion. In some embodiments, an additional dampener may be attached to the dampener attachment point 150 to further resist the lowering of the lip 104. As the lip 104 lowers, the lip spring 146 compresses and when the lip 104 is about halfway down the lip spring 146 alignment shifts caused by the quarter circle shape of the lip spring connector bracket 154 allowing the lip 104 to lower completely without resistance from the lip spring 146. In practice, the unloading surface (e.g., trailer bed) will provide the resistance necessary to keep the lip 104 in place. In the absence of an unloading surface, the lip 104 will return to the stowed position. This configuration reduces the number of moving parts and the overall weight of the dock leveler 100 as well as reduces the complexity of the dock leveler 100 without sacrificing functionality.

Figure 19:
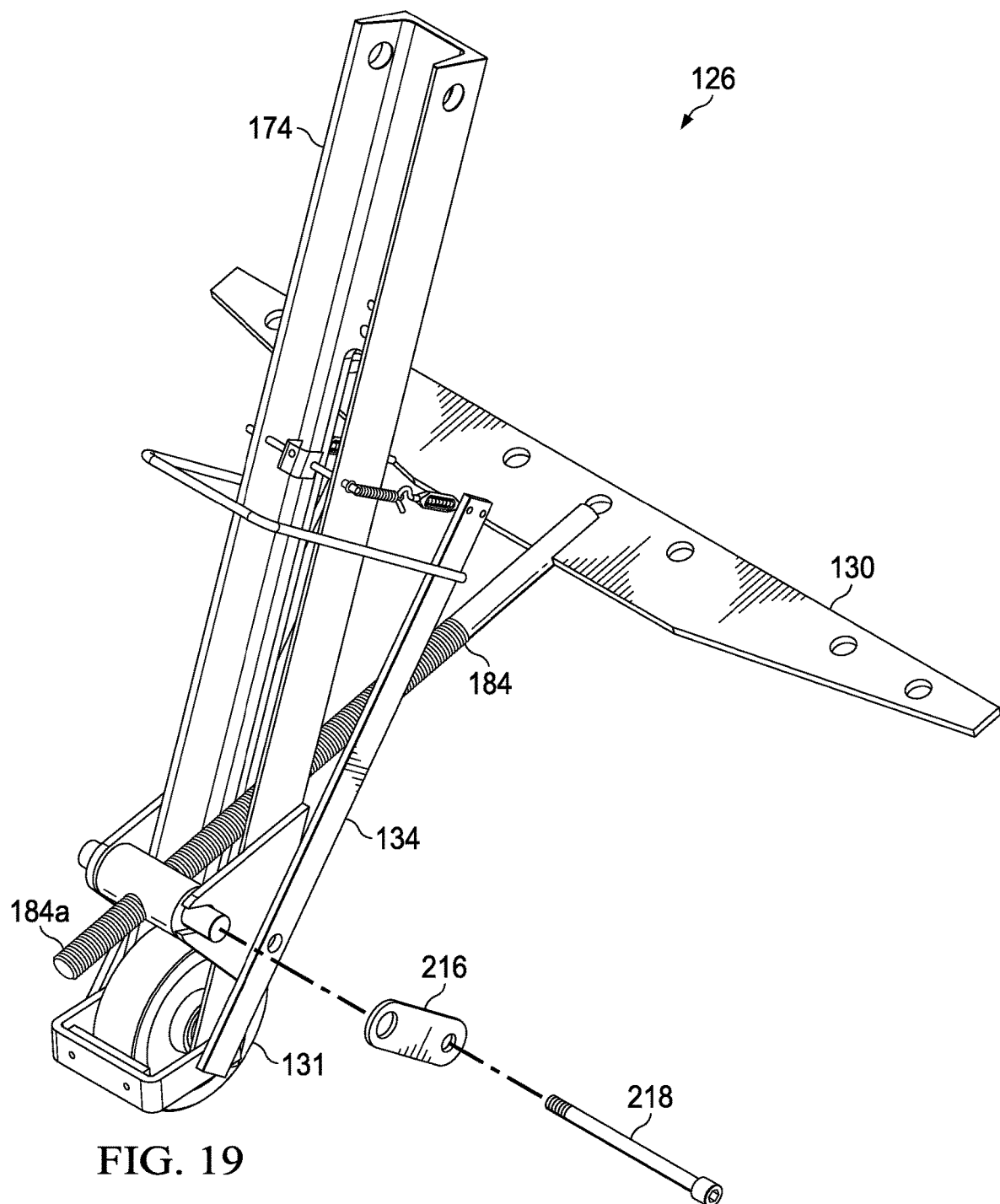
FIG. 19 is an exploded perspective illustration of components used to secure a lift arm to a hold down assembly, according to one example implementation.

With reference to FIGS. 16-19, depicted are perspective and exploded perspective views of the components of the lift arm assembly 126 with and without the deck 102. The novel design of the lift arm assembly 126 improves the usability and maintainability of the dock leveler 100. Notably, FIG. 19 illustrates the novel one bolt disassembly of the lift arm assembly 126. The lift arm assembly 126 includes the lift arm 174, the wheel 131, the brake 132, and the spring connector 130. The lift arm 174 is made of metal, such as steel for example, and is designed to withstand the forces placed on it by the weight of the deck and workers and the tension of the deck springs 128 as the lift arm assembly 126 extends and retracts causing the deck 102 to move up and down.

The lift arm assembly 126 further includes a dowel 202, a tension bracket 204, a first spacer 206, a first plate 208, an adjust screw support 210, a second plate 212, a second spacer 214, a lock plate 216, a bolt 218, an axle 220, and bearings 222. The wheel 131 is located between holes 174c of the lift arm 174. The bearings 222 are placed between the wheel 131 and the holes 174c, with one bearing 222 on each side of the wheel 131. The axle 220 disposed through the bearings 222, the wheel 131, and the holes 174c.

The adjust screw support 210 is disposed between holes 174b of the lift arm 174 with the hole 210a being perpendicular to the lift arm 174 and the slot 174d of the lift arm 174. The first plate 208 and the second plate 212 are located on either side of the lift arm 174, adjacent the holes 174b with the holes 208a and 212a aligned with the holes 174b. The first spacer 206 and the second spacer 214 are inserted into either side of the adjust screw support 210. The first spacer 206 is held in place by a hole 208b in the first plate 208 and the second spacer is held in place by a notch 212b in the second plate 212. The lock plate 216 is located adjacent to the second plate 212 with the second plate 212 between the lock plate 216 and the lift arm 174. A hole 216a of the lock plate 216 is located adjacent the hole 212a and a hole 216b is located adjacent the notch 212b. The hole 216b is sized for the second spacer 214 to pass through the hole 216b. After placing the brake arm 134, the bolt 218 passes through the hole 216a, the hole 212a, both holes 174b, and the hole 208a to secure the adjust screw support 210 and the brake arm 134 to the lift arm 174.

The brake arm 134 includes a handle 228, two springs 224, two adjusters 226, and the brake 132 consisting of a brake pad 132a and a brake pad support 132b. The brake arm 134 may include one or more arms with the handle coupled to an upper portion of the one or more brake arm 134. In the illustrated embodiments, there are two brake arms 134 with the handle 228 coupled to both brake arms 134. The brake pad support 132b is coupled to a lower portion of the one or more brake arms 134 and below holes 134a in the brake arm 134. Specifically, the brake pad support 132b is coupled to the brake arms 134 with the brake pad 132a coupled to the brake pad support 132b. The brake pad support 132b may be welded or bolted to the brake arms 134.

The brake arm 134 is disposed over and exterior to the first plate 208 and the second plate 212. The holes 134a of the brake arm 134 align with the holes 208a and 212a of the first and second plates 208, 212 and the hole 216a of the lock plate 216. The brake arm 134 is located over the axle 220 but does not contact the axle 220. As mentioned above, the bolt 218 passes through the hole 134a, the hold 216a, the hole 212a, both holes 174b, the hole 208a, and the hole 134a to secure the brake arm 134, the wheel 131, and the adjust screw support 210 to the lift arm 174. The dowel 202 is passed through holes 174a of the lift arm 174 and through the tension bracket 204 that holds the dowel 202 in place. Each adjuster 226 is coupled at one end to the brake arm 134 and at the other end to one end of one of the springs 224. The other end of each spring 224 is coupled to each end of the dowel 202. The springs 224 provide tension, pulling the adjusters 226 and thereby pulling the brake arm 134 which rotates around the bolt 218 to press the brake pad 132a against the wheel 131. The brake arm 134 may be pulled away from the lift arm 174, extending the springs 224, and moving the brake pad 132a away from the wheel 131. The adjusters 226 can be adjusted to be longer or shorter to calibrate the brake 132 for optimum braking.

The spring connector 130 is attached to one end of an adjust screw 184 and includes holes 130a for attaching the deck springs 128. The other end 184a of the adjust screw 184 passes through hole 210a of the adjust screw support 210. A nut is placed over the end 184a of the adjust screw 184 that extends through the adjust screw support 210. The nut allows the user to increase or decrease the tension of the deck springs 128. Importantly, the placement of the adjust screw 184 and the nut allow a worker to adjust the tension of the deck springs 128 without having to climb under the dock leveler 100. This design improves the safety and maintainability of the dock leveler 100.

A novel design feature of the dock leveler 100 and specifically the lift arm assembly 126 is the single bolt disassembly as illustrated in FIG. 19. A worker may disassemble the lift arm assembly and perform maintenance by removing a single bolt, the bolt 218. After removing the bolt 218, the lock plate 216 is removed. This provides easy access to the brake arm 134 and the brake 132 allowing a worker to replace the brake pad 132a with minimal effort. This design also allows a worker to replace the wheel 131 with minimal effort and tools. Furthermore, all of this is accessible at the front of the dock pit 110 so that the worker does not have to crawl under the dock leveler 100 to perform the maintenance. If the worker does decide to crawl under the dock leveler 100 to perform the maintenance, the frameless design of the dock leveler 100 provides ample room to perform the maintenance safely and efficiently.

Figure 20A:
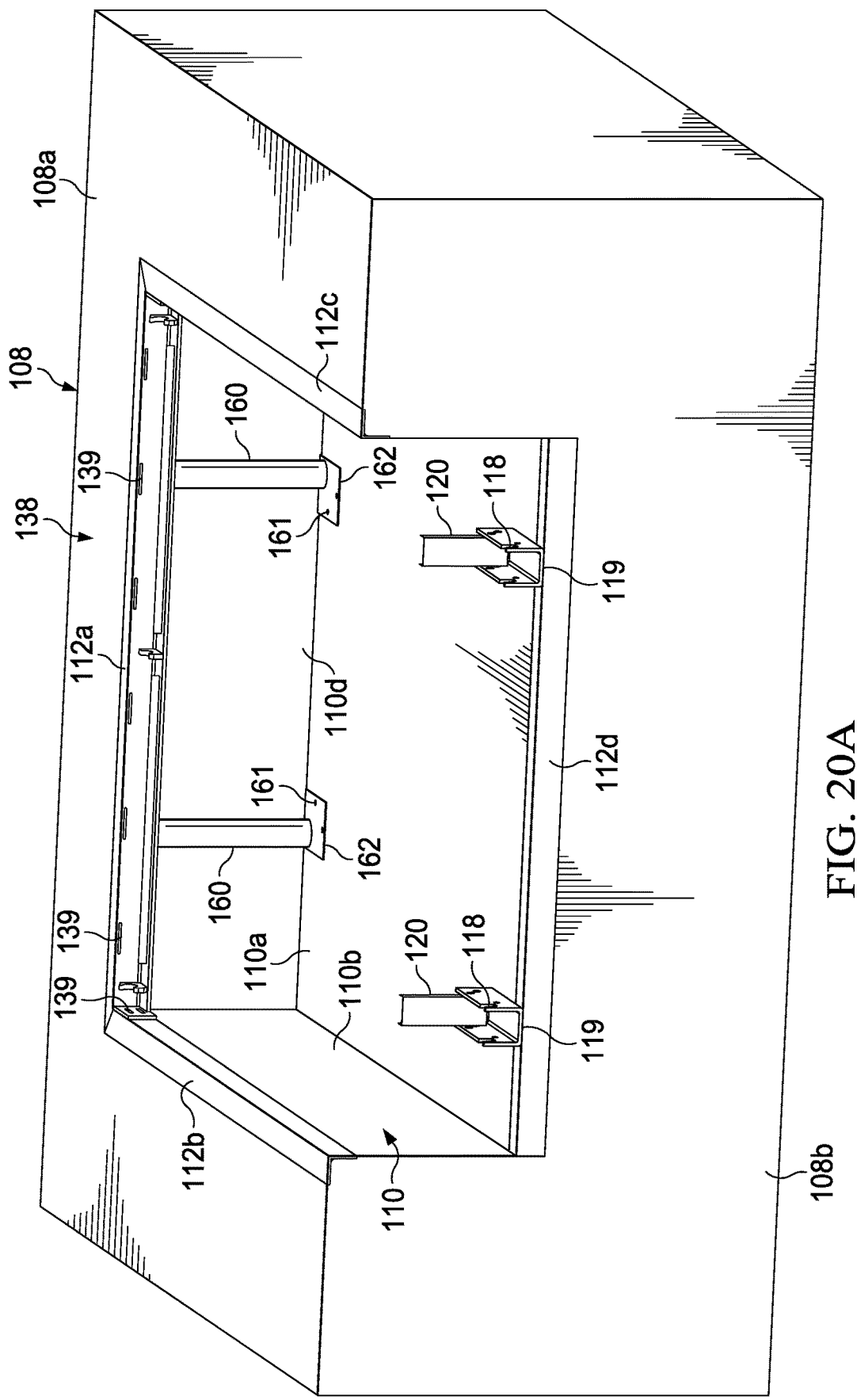
FIGS. 20A-20F are illustrations of an exemplary method of installing a dock leveler in a dock pit of a loading dock, according to one example implementation.
Figure 20B:
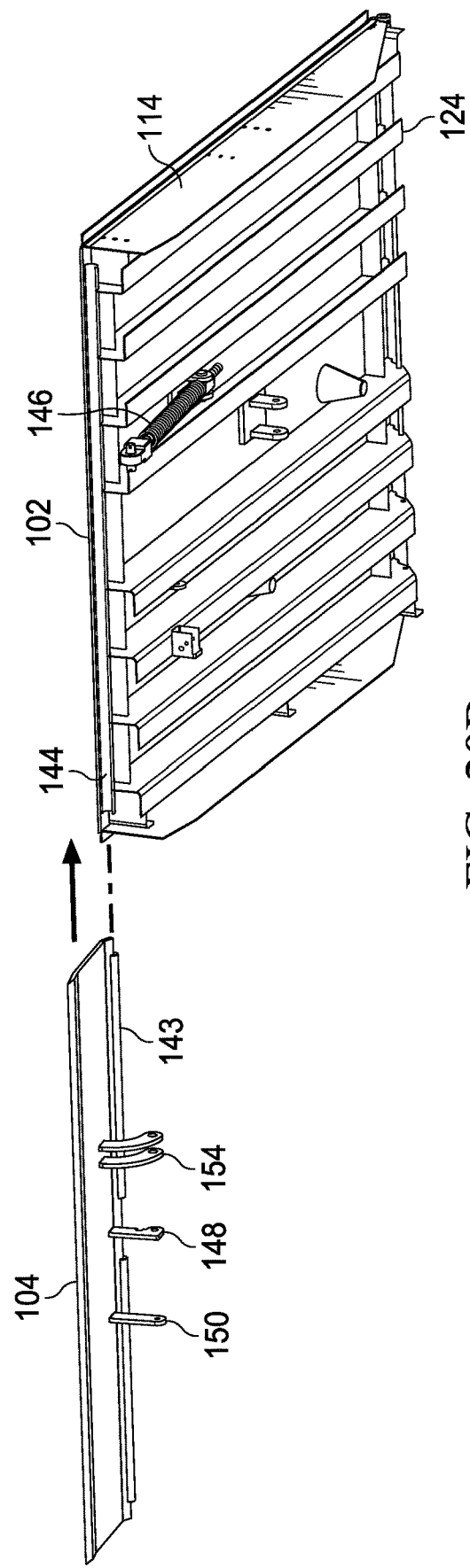
Figure 20C:
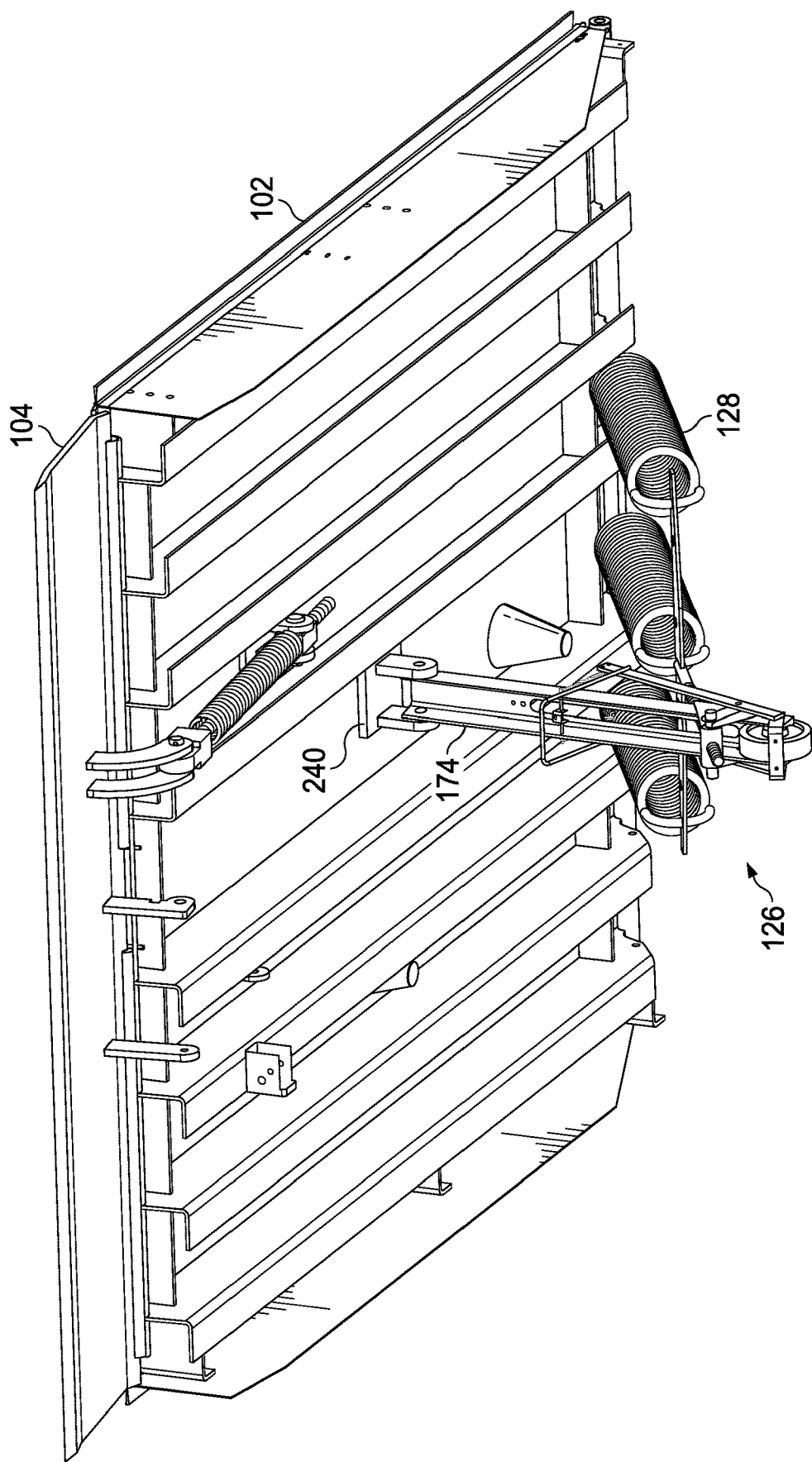
Figure 20D:
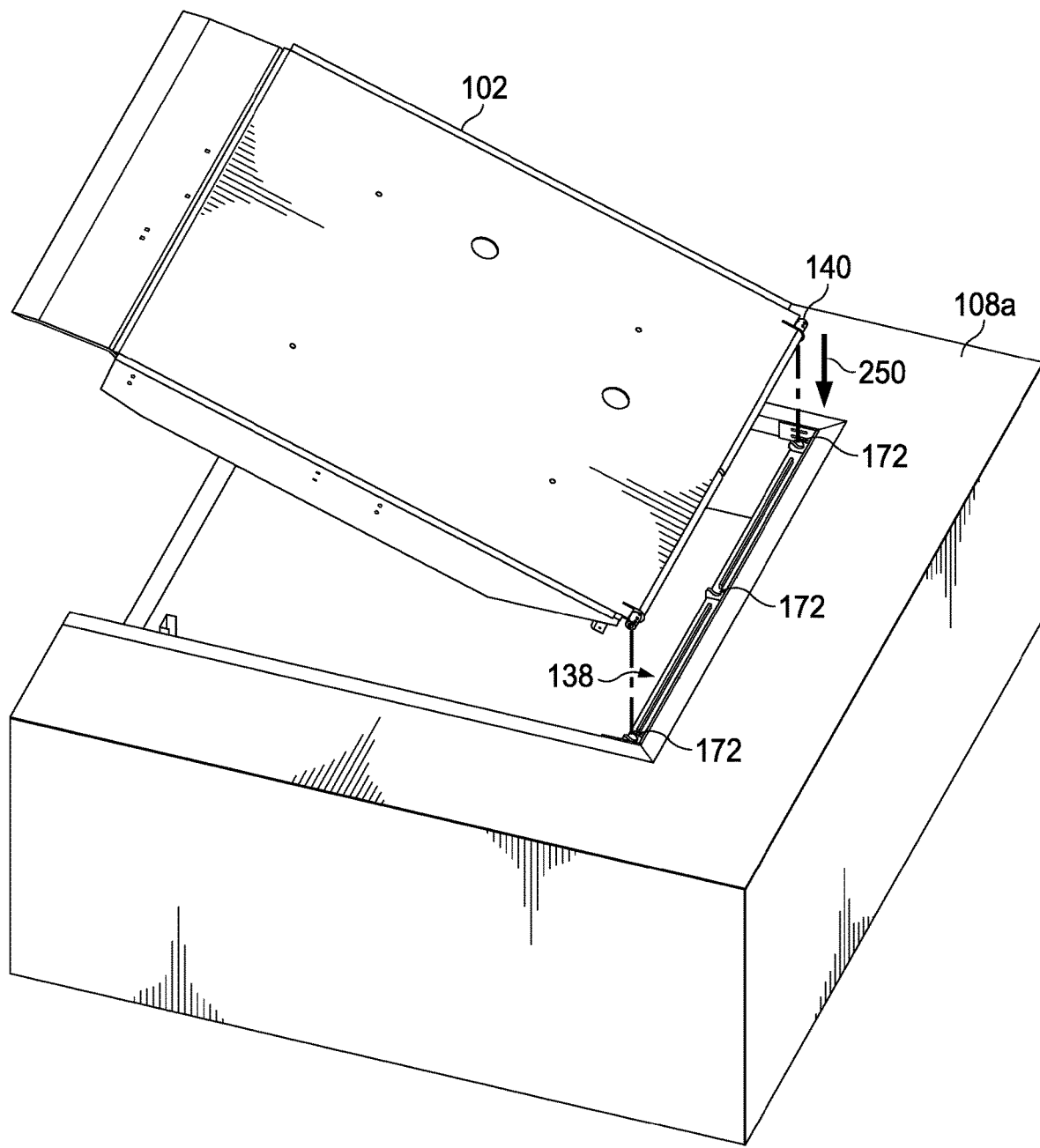
Figure 20E:
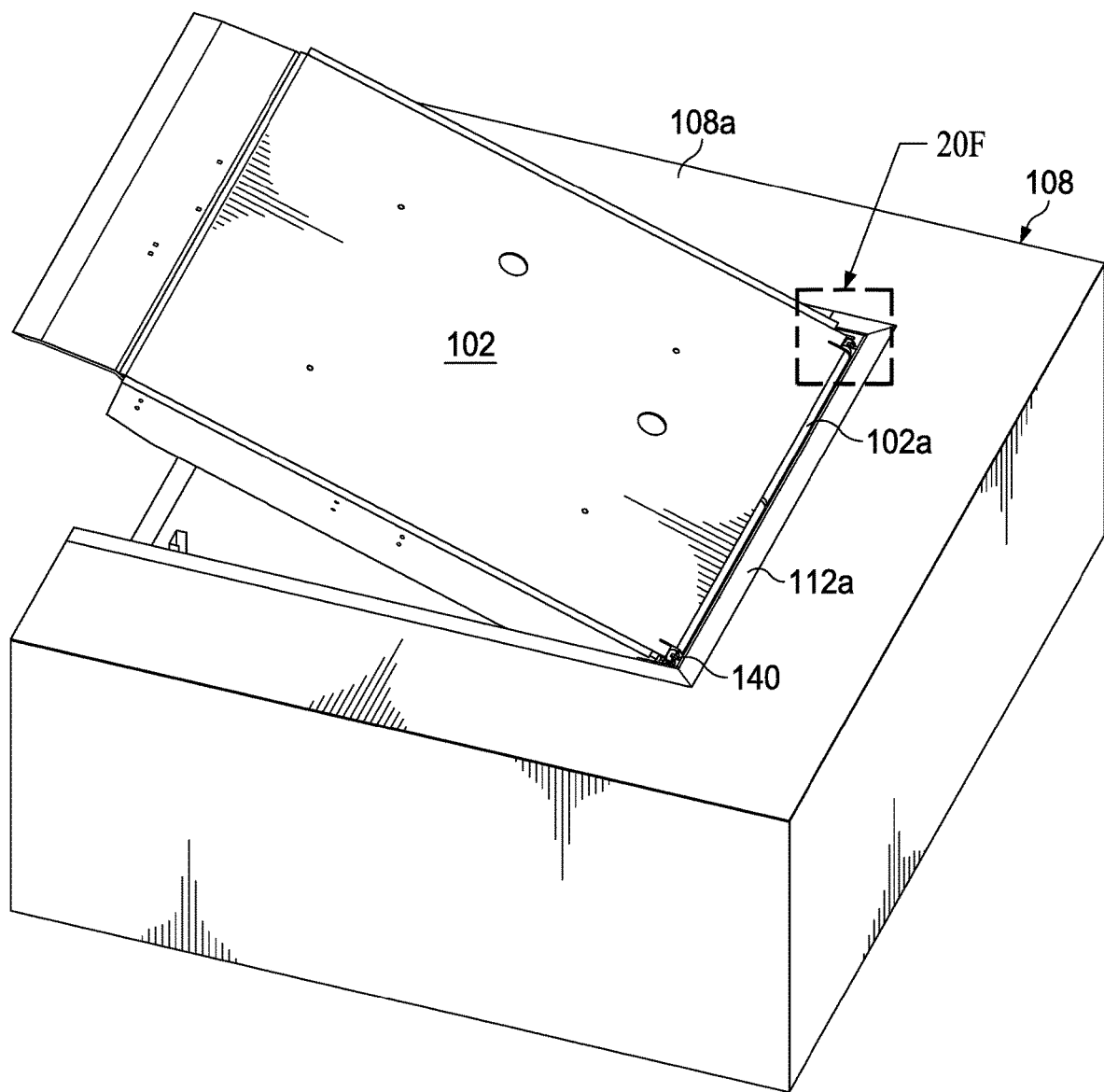
Figure 20F:
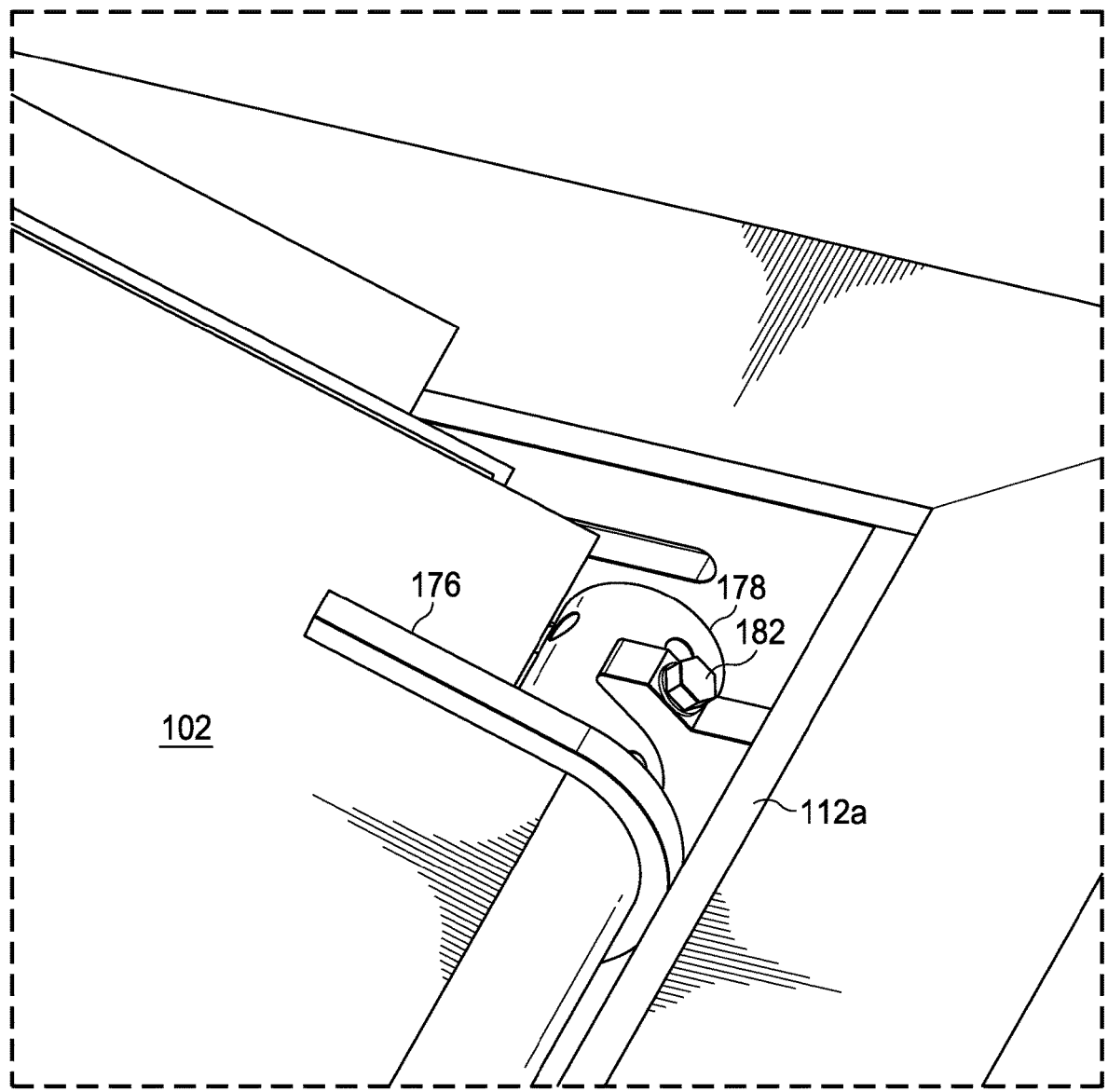

With reference to FIGS. 20A-20F, depicted are perspective views of a method of installing the dock leveler 100. FIG. 20A depicts the installation of the leg bracket 138 and the lip keepers 118. FIG. 20B depicts the coupling the lip 104 to the deck 102 to form the lip hinge 142. FIG. 20C depicts coupling the lift arm assembly 126 to the underside of the deck 102. FIG. 20D depicts coupling the deck 102 to the leg bracket 138 to form the deck hinge 140. FIG. 20E depicts the deck 102 coupled to the leg bracket 138. FIG. 20F depicts the inserting the set bolt 182 to secure the deck 102 to the leg bracket 138.

With reference to FIG. 20A, the dock leveler 100 installation begins. The loading dock 108 is prepared including forming the dock pit 110 and installing the curb angles 112a-112d. Importantly, the dock leveler 100 installation begins with the open pit and installing the leg bracket 138 with no obstructions in the dock pit 110 and being able to work in the open instead of under the deck 102 as required by conventional dock levelers. The leg bracket 138 is positioned as a single unit including the feet 162, the legs 160, and upper portion including the bottom plate 168, the rear plate 164, the side plates 166a, 166b, the stock plates 170, and the C-brackets 172. A worker bolts the feet 162 to the bottom 110a of the dock pit 110 through holes 161 in the feet 162. The rear plate 164 and side plates 166a, 166b are then welded to the curb angles 112a, 112b, 112c at weld points 139.

After the leg bracket 138 is installed, the lip keepers 118 including safety legs 120 are installed. Again, the open pit design allows for easy access to all work locations. The lip keepers 118 are placed at the front of the dock pit 110 and are welded to the curb angle 112d. In some examples, the lip keepers may further be bolted to the bottom 110a of the dock pit 110.

In the example implementation shown, the floor of the dock pit may include a front region, an intermediate region, and a rear region. The leg bracket 138 may be disposed in the rear region, the lip keepers may be installed in the front region, and the intermediate region may be free of fixed support components. In some implementations, the front region extends about a third of the distance between the rear and the front of the pit, the intermediate region extends about a third of the distance between the rear and the front of the pit, and the front region extends about a third of the distance between the rear and the front of the pit. As such, the dock leveler may have a fixed footprint (e.g., components that are not moveable relative to the pit) on the floor that is disposed only in the front region and in the rear region. In some aspects, the fixed footprint is created by independently introducing and fixing components in the front region and in the rear region. For example, the leg bracket is introduced and fixed into the rear region and the lip keepers are separately and independently introduced and fixed in the pit in the front region.

With reference to FIG. 20B, the dock leveler 100 installation continues with the lip 104 being coupled to the deck 102. The cylinder 143 that is coupled to the lip 104 is inserted into the shaft 144 that is coupled to the deck 102. The cylinder 143 slides through shaft 144 until the lip 104 and the deck 102 are aligned. This forms the lip hinge 142. The lip spring 146 is then coupled to the lip spring connector bracket 154 at one end and the underside of the deck 102 at the other end. The dampener, if installed, is connected to the dampener bracket 150 at one end and the underside of the deck 102 at the other end.

With reference to FIG. 20C, the dock leveler 100 installation continues with assembling the lift arm assembly 126 and coupling the lift arm assembly 126 to the underside of the deck 102. This step of the installation process is performed outside of the dock pit 110 allowing the workers to move freely and improving the safety of the workers. The lift arm assembly 126 is assembled as described above with respect to FIGS. 16-19. The upper portion of the lift arm 174 is coupled to a bracket 240 on the underside of the deck 102. The lift arm 174 is coupled to the bracket 240 using bolts to allow for the free rotation of the lift arm 174 as the lift arm assembly 126 rolls to raise and lower the deck 102. One end of each deck spring 128 is attached to the spring connector 130 of the lift arm assembly 126. The other end of each deck spring 128 is attached to an attachment point on the underside of the deck 102.

With reference to FIGS. 20D-20F, the dock leveler 100 installation continues with coupling the deck 102 with the leg bracket 138. A crane, forklift, or other heavy machinery may be used to lift the deck 102 into position. This step of the installation is performed with all workers outside of the dock pit 110 allowing for easier movement of the workers and improved safety during installation. The deck 102 is lowered on the leg bracket 138 as indicated by arrow 250 until the shaft 141 is properly seated in the C-brackets 172. At this point the deck 102 may be fully lowered and the lift arm assembly 126 and deck hinge 140 can support the weight of the dock leveler 100. The end 178 of the shaft 141 is accessible from above, so a person does not need to be under the deck 102 to couple the deck 102 to the leg bracket 138. A set bolt 182 is inserted into a hole of each end 178 of the shaft 141 to secure the shaft 141 to the C-brackets 172 and complete the deck hinge 140. This secures the deck 102 to the leg bracket 138. The dock leveler 100 is now installed and ready for use without anyone having to crawl into the dock pit 110 under the deck 102.

Figure 21:
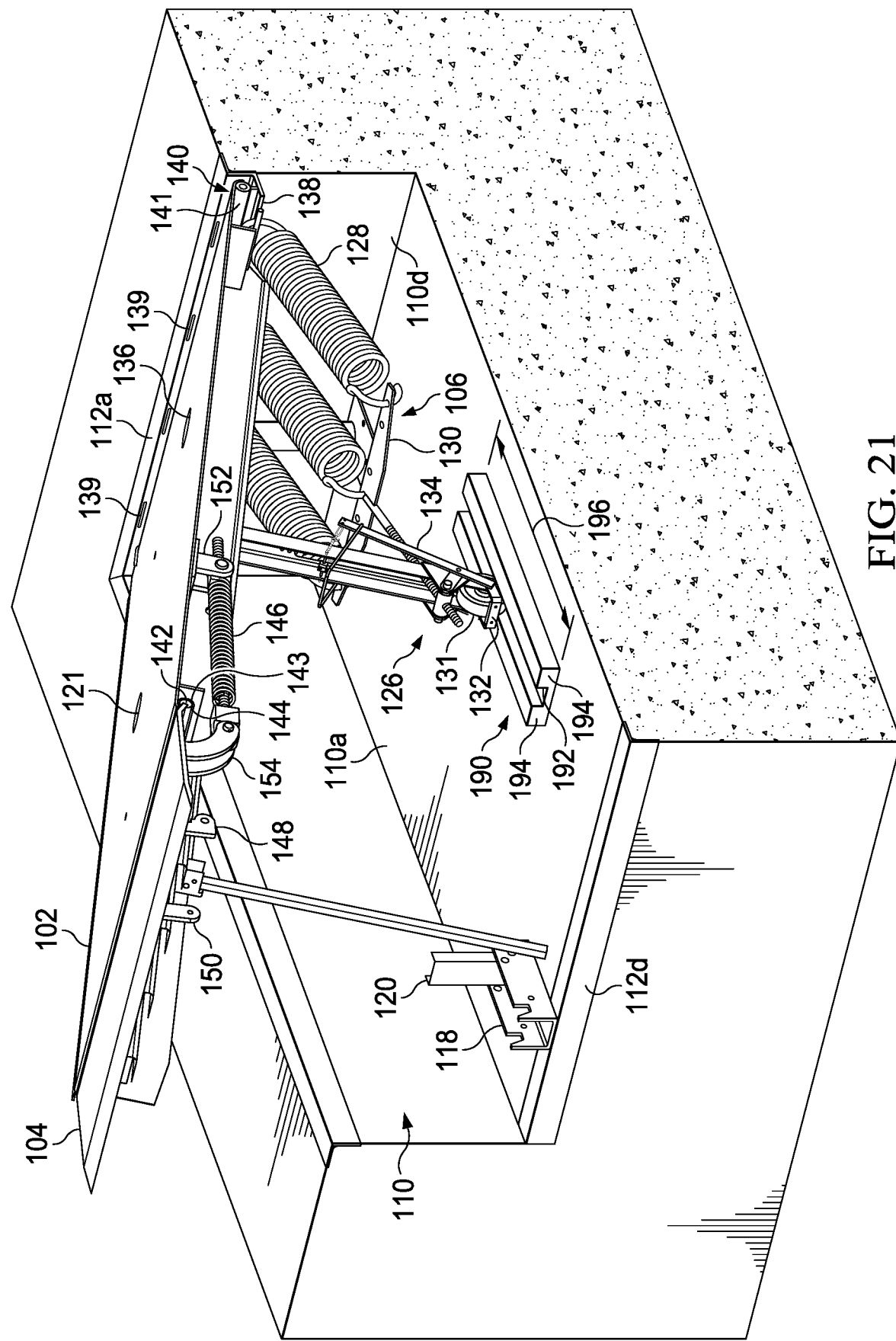
FIGS. 21 and 22 are perspective illustration views of embodiments including a runner strip, according to an example implementation.
Figure 22:
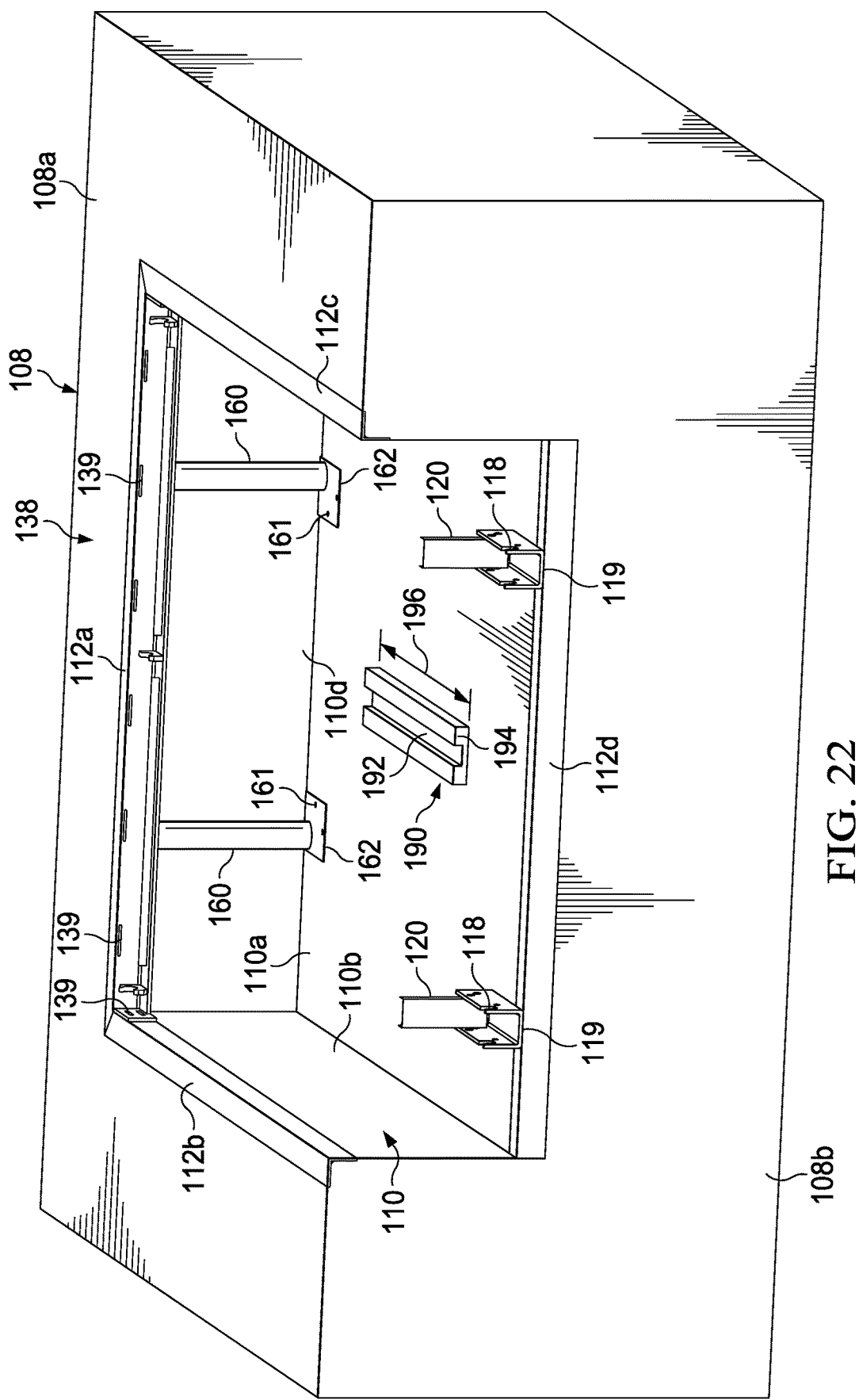

In some embodiments, the dock leveler 100 may include a runner strip 190. A dock leveler 100 including a runner strip 190 can be seen in FIGS. 21 and 22. FIG. 21 shows a perspective cross section of the dock leveler 100 installed in a pit 110 with the runner strip 190. FIG. 22 shows a perspective view of the footprint (the portions of the dock leveler 100 affixed to the pit 110) of the dock leveler 100 including a runner strip 190. In this embodiment, the runner strip 190 is an elongate block, with a cutout running from the front of the running strip 190 to the back, forming a track 192 flanked by sides 194. In other embodiments, the running strip 190 may only comprise two blocks that are spaced from each other such that they form a track 192. The wheel 131 of the lift arm 174 fits into the track 192 such that the wheel 131 can still roll forward and back. The sides 194 of the runner strip 190 prevent the wheel 131 from moving laterally (i.e., sliding out) and ensure that the wheel 131 moves smoothly forward and back.

The runner strip 190 may be affixed to the bottom surface of the pit 110a in any appropriate manner. For example, the runner strip 190 may be bolted into the bottom of the pit 110a. The runner strip 190 has a length 196 sufficient for the wheel 131 to roll back with the lift arm 174 to push the deck 102 up to an extended position and roll forward with the lift arm 174 to move the deck 102 into a stowed position or a position lower than a stowed position.

In view of all the teachings herein, the present disclosure contemplates a variety of different aspects including but not limited to the following:

An example embodiment of the present disclosure is a dock leveler sized to fit in a pit of a loading dock. The dock leveler may comprise a rear leg bracket, a deck, and a lift arm. The rear leg bracket may include a plurality of legs couplable to a bottom surface of the rear leg bracket and a rear wall of the pit. Each leg of the plurality of legs may have a bottom portion attached to the bottom surface of the pit. The deck may have a top, a bottom, a front portion, and a rear portion. In some embodiments, the deck may be horizontal when in a stowed position. The rear portion of the deck may be disposed adjacent the rear wall and supported by the rear leg bracket when the deck is installed in the pit. The lift arm assembly may extend from the bottom surface of the deck to the bottom surface of the pit and may be moveable along the bottom surface of the pit. The lift arm assembly may also have a bottom portion that is movable independent of structure at the bottom portion of the plurality of legs.

In some embodiments, the bottom portion of the legs may be fixed supports and may be arranged to be disposed only in a rear third of the pit when the pit is properly installed for use. In some embodiments, the dock leveler may also have a lip keeper disposable at a forward end of the pit, where lip keeper is independently installable relative to the bottom portion of the legs and relative to the bottom portion of the lift arm. The dock leveler may also include a hold-down assembly that extends rearwardly from the lift arm assembly toward the rear wall of the pit. In some embodiments, the hold-down assembly may extend rearwardly from the lift arm assembly to the rear leg bracket or the deck. The hold-down assembly may also comprise a biasing member that biases the deck toward a raised position. In some embodiments, the biasing member may be a spring. In some embodiments, the leg of the leg bracket assembly may comprise a foot at the bottom portion, each foot being separate. In some embodiments, the lift arm assembly may be moveable within a middle third of the bottom surface of the pit. The dock leveler may also comprise a hold-down assembly that connects the lift arm assembly to the deck.

Another embodiment of the present disclosure is a dock leveler sized to fit in a pit of a loading dock and comprising a rear leg bracket, a lip keeper, a deck, and a lip. The rear leg bracket may be disposed adjacent a rear wall of the pit. The lip keeper may be disposed at a forward edge of the pit such that the lip keeper is spaced from and independently installable from the rear leg bracket, creating an environment having a substantially open area. The deck may have a forward end and a rearward end such that the rearward end is supported by the rear bracket and the forward end extends over the lip keeper. The lip may be pivotably attached to the forward end of the deck for disposal in the lip keeper when the deck is in a storage position.

In some embodiments, the dock leveler may also comprise a lift arm assembly extending from the bottom surface of the deck to the bottom surface of the pit and moveable along the bottom surface of the pit the lift arm assembly. The pit may have a bottom portion devoid of structural features connecting the bottom portion of the lift arm assembly to a bottom portion of the rear leg bracket. The dock assembly may further comprise a hold-down assembly connecting the lift arm assembly to the deck. In some embodiments, the dock leveler may also comprise a second lip keeper disposed parallel to the first lip keeper. In some embodiments, the lip may be vertical when the deck is in the storage position. The deck may be horizontal when in the storage position.

Another embodiment of the present disclosure may include a loading dock that may comprise a dock wall, a dock floor, a rear curb angle, a front curb angle, and a dock leveler. The dock floor may have a pit formed therein, the pit having a back wall, a first sidewall, a second sidewall, a pit floor, and an open front end formed in the dock wall. The pit floor may also comprise a front region, an intermediate region, and a rear region. The rear curb angle may form the intersection between the dock floor and the back wall. The front curb angle may form the intersection of the pit floor and the dock wall. The dock leveler may have a fixed footprint on the floor that is created by independently introducing and fixing components in the front region and in the rear region of the pit.

In some embodiments, the dock leveler may comprise a guide plate independently introduced and fixed to the pit floor. In some embodiments, the fixed footprint may be defined in part by lip keepers secured to the front curb angle. The deck of the dock leveler may be immediately adjacent to the leg bracket, the leg bracket being welded to a curb angle of the pit.

An example embodiment of the present disclosure includes a dock leveler sized to fit in a pit of a loading dock. The dock leveler may comprise a rear leg bracket and a deck. The rear leg bracket may include a plurality of legs couplable to a bottom surface and a rear wall of the pit. The leg bracket may also be positionable directly adjacent the rear wall. In some embodiments, the leg bracket may include a plurality of brackets having an upwardly facing opening configured to receive a cylindrical shaft. The deck may have a front portion and a rear portion. The rear portion of the deck may be adjacent the rear wall when the deck is installed in the pit and may be shaped to fit over the cylindrical shaft. In some embodiments, the cylindrical shaft may be sized to fit within the plurality of brackets. The rear portion of the deck and the shaft may be disposed directly above the legs of the leg bracket.

In some embodiments, the leg bracket may be sized to extend from a first sidewall of the pit to a second sidewall of the pit. In some embodiments, the leg bracket may comprise two or more legs, each leg being independently couplable to a bottom surface of the pit at a first end and being coupled to the bracket at an opposing second end. Each bracket of the plurality of brackets may have a semi-circular shape that supports the cylindrical shaft. In some embodiments, the rear portion of the deck may be adjacent the rear wall and disposed so that only a vertical plate of the leg bracket is disposed between the rear portion of the deck and a loading dock floor. In some embodiments, a rear surface of the rear portion of the deck may be bent downward. In some embodiments, only a vertical portion of the bracket may separate the rear portion of the deck from a curb angle.

Some embodiments include a dock leveler comprising a leg bracket, a shaft, and a deck. The leg bracket may include two or more legs and a bracket connecting the two or more legs. The bracket may have a first width and may include two or more C-shaped brackets. The shaft may extend along the bracket within the C-shaped brackets. The deck may have a bottom surface, a front edge, and an opposing rear edge. In some embodiments, the rear edge of the deck may be supported by the shaft and the C-shaped brackets may support the shaft.

In some embodiments, a first surface of each leg may be coupled to a bottom surface of a dock pit and an opposing second surface of each leg being may be coupled to a bottom surface of the bracket. The bracket may comprise at least one stock plate arranged to extend along and support the shaft. In some embodiments, the C-shaped brackets may be disposed directly over the legs. In some embodiments, the rear surface of the rear portion of the deck may be bent downward. In some embodiments, the C-shaped brackets may have an inner surface and the shaft may contact the inner surface of the C-shaped brackets. In some embodiments, the leg bracket may further comprise a fastener to secure the shaft to the C-shaped brackets. In other embodiments, the fastener may be a through bolt or pin.

Another embodiment of the present disclosure is a method of forming a connection on a dock leveler. The method may comprise the steps of: providing a deck attachable about a cylindrical shaft; placing the deck above a bracket, which includes a plurality of C-shaped brackets; inserting the cylindrical shaft into an opening of the C-shaped brackets so that the deck is supported by the C-shaped brackets; and securing the cylindrical shaft to the C-shaped brackets.

In some embodiments, the method of forming a connection on a dock leveler may also include the step of shaping the rear edge of the dock leveler deck to follow a round profile of the cylindrical shaft. The method may also include rotatably coupling the rear edge to the cylindrical shaft. In some embodiments, each C-shaped bracket may include an opening and a curved inner surface. In some embodiments, the step of inserting the cylindrical shaft may also include the cylindrical shaft contacting an inner curved inner surface of the C-shaped bracket.

Another embodiment of the present disclosure is a dock leveler comprising a deck, a lip, a joint, and a pivot bar. The deck may have a front portion and a rear portion. The lip may be disposed at the front portion of the deck, and may have a top surface, a front surface, and a rear surface. The joint may connect the deck to the lip to allow the lip to pivot relative to the deck. In some embodiments, the joint may comprise a C-shaped shaft coupled to one of the lip and the deck, where the C-shaped shaft has a hollow interior and a radial opening to the hollow interior. In some embodiments, the radial opening of the C-shaped shaft may be less than 180 degrees. The pivot bar may be coupled to the other of the deck and the lip such that the pivot bar is pivotably disposed in the hollow interior of the C-shaped shaft and in a manner allowing the lip to pivot relative to the deck between a down position and an up position.

In some embodiments, the pivot bar may comprise a slot and said other of the deck and the lip may extend through the opening and be fixed in the slot. In some embodiments, the lip may be fixed to the pivot bar and the C-shaped bar may be supported by the deck such that the pivot bar is supported by the C-shaped bar. The C-shaped shaft may extend an entire width of the deck. In some embodiments, the joint that connects the deck to the lip may comprise a continuous C-shaped shaft. In some embodiments, the joint connecting the deck to the lip may comprise a continuous pivot bar. In an example embodiment, the joint connecting the deck to the lip may comprise only one C-shaped shaft and only one pivot bar. In some embodiments, the lip may comprise an upper surface and a lower surface, the lower surface having a bevel formed thereon to face a bed of a vehicle. In some embodiments, a forward surface of the front portion of the deck may be bent downward. The lip and the deck may form an upward facing pocket when the lip is extended from the deck, and the lip may be configured to shed debris captured in the upward facing pocket when it rotates downward. In some embodiments, the deck may extend over the hinge. In some embodiments, the deck edge may extend over the lip.

In some instances, the dock leveler may comprise a deck, a lip, and a cylinder joint. The deck may have a front portion and a rear portion. The lip may be disposed at the front portion of the deck and may have a top surface, a front surface, and a rear surface. In some embodiments, the cylinder joint may connect the deck to the lip to allow the lip to pivot relative to the deck. The cylinder joint may have a radial pivot opening of less than 180 degrees.

In some embodiments, the cylinder joint may comprise a C-shaped shaft and a pivot bar. The C-shaped shaft may be coupled to one of the lip and the deck and may have a hollow interior and a radial opening to the hollow interior. In some embodiments, the pivot bar may be coupled to the other of the deck and the lip, the pivot bar being pivotably disposed in the hollow interior in a manner allowing the lip to pivot relative to the deck between a down position and an up position. In some embodiments, the cylinder joint connecting the deck to the lip may comprise a continuous C-shaped shaft. In other embodiments, the cylinder joint connecting the deck to the lip may comprise a continuous pivot bar. In some embodiments, the one of the deck and the lip may project from the radial pivot opening and may pivot relative to the other of the deck and the lip. In some embodiments, the cylindrical joint may comprise a pivot bar having a slot, and one of the deck and the lip may extend through the radial pivot opening and into the slot. The lip may be fixed to the pivot bar and the C-shaped shaft may be supported by the deck. In some embodiments, the cylinder joint may extend an entire width of the deck. In some embodiments, the cylinder joint connecting the deck to the lip may comprise a continuous C-shaped shaft and more than one pivot bar. The lip may comprise an upper surface and a lower surface, the lower surface having a bevel formed thereon to face a bed of a vehicle.

Another embodiment of the present disclosure is a dock leveler that may comprise a deck and a lip. The deck may have a front portion and a rear portion. The lip may be pivotably disposed at the front portion of the deck and may have a top surface and a bottom surface. In some embodiments, the lip may have a leading end with a bevel formed thereon, the bevel being formed on an underside of the lip to provide a minimal transition from a delivery bed to the top surface of the lip.

In some embodiments, there may be a traction pattern on the top surface of the lip. In some embodiments, the traction pattern may extend on the top surface of the leading end of the lip. In some embodiments, the bevel may comprise a two-dimensional surface configured to face and contact the delivery bed.

Some embodiments may include a method of installing a dock leveler. The method may include the steps of: placing a leg bracket in a pit of a loading dock, where the pit has a bottom surface, a front opening, a rear wall, a first sidewall, and a second sidewall; coupling the leg bracket to the rear wall of the pit; coupling a rear portion of a lip to a front portion of a deck; coupling a lift arm assembly to a bottom surface of the deck; lifting the assembled deck over the pit; and lowering the assembled deck onto the leg bracket; and securing the deck to the leg bracket.

In some embodiments, the method of installing a dock leveler may also include the steps of coupling the leg bracket to the bottom surface of the pit, placing one or more lip keepers on the bottom surface and along the front opening of the pit, and coupling the one or more lip keepers to the bottom surface of the pit. In some embodiments, the step of securing the deck to the leg bracket may be performed by an installer from a position above the deck. In some embodiments, the step of lowering the assembled deck onto the leg bracket may comprise lowering a shaft on the deck from above into a receiver on the leg bracket. In some embodiments, the method may also include securing the shaft to the leg bracket using a fastener from above the deck.

An example embodiment of the present disclosure includes a dock leveler that may comprise a deck, a lift, and a hold-down. The deck may be disposed over a pit of a loading dock. The deck may have a first side and a second side that define a centerline. The lift may be configured to bias the deck from a horizontal stowed position toward a raised position. The hold-down may be configured to counteract a force applied by the lift and to apply a hold-down force along the centerline of the deck.

In some embodiments, the hold-down may comprise a brake. The brake may be actuatable from a location above the deck. In some embodiments, the lift may comprise a wheel, and the brake may comprise a brake arm actuatable to engage or disengage a brake pad from the wheel. In other embodiments, the brake may also comprise an actuator configured to engage or disengage a brake pad from the wheel. In some embodiments, the actuator may be a chain. the lift comprises a lift arm and biasing elements configured to apply a force on the lift arm. In some embodiments, the biasing elements may be springs. In some embodiments, the lift arm may comprise a wheel configured to travel along a floor of the pit.

Another embodiment includes a dock leveler that may comprise a deck, a bracket, a lift arm assembly, and a plurality of deck springs. The deck may be disposed over a pit of a loading dock and may have a top surface, a bottom, a first side, and a second side. The bracket may be disposed on the bottom of the deck such that it is centered between the first side and the second side of the deck. The lift arm assembly may be disposed under the deck and coupled to the bracket. In some embodiments, the lift arm assembly may include a wheel and a brake, the wheel being positioned to roll along a floor of the pit. The plurality of deck springs may be disposed under the deck such that each spring is coupled to the lift arm assembly and the deck.

In some embodiments, the lift arm assembly is centered laterally beneath the deck. In some embodiments, each deck spring of the plurality deck springs may include a first end and a second end, the first end of each of the plurality of deck springs being coupled to a fixture, and the second end of each of the plurality of deck spring being coupled to the lift arm assembly. The brake may be biased to be engaged until a force is applied to the brake.

An example embodiment of the present disclosure includes a dock leveler that may comprise a deck and a lift arm assembly. The lift arm assembly may be disposed below the deck. The lift arm assembly may also include a lift arm having an upper portion attached to the deck and a lower portion, a wheel coupled to the lower portion of the lift arm, a brake disposed adjacent the wheel and including a brake arm and a brake pad support coupled to the brake arm, an adjustment screw support disposed above the wheel and extending through the lift arm, and a fastener coupled to the brake to the lift arm.

In some embodiments, a lock plate may be disposed adjacent the lift arm and may be configured to secure an adjustment screw support relative to the lift arm. In some embodiments, a brake pad may be disposed on the brake pad support. In some embodiments, the transversely extending fastener may extend through the adjustment screw support. In some embodiments, the lift arm may comprise a longitudinally extending slot configured to receive an adjust screw.

Although various embodiments of the claimed subject matter have been described above with a certain degree of particularity, or with reference to one or more individual embodiments, those skilled in the art could make numerous alterations to the disclosed embodiments without departing from the spirit or scope of the claimed subject matter. Still other embodiments are contemplated. It is intended that all matter contained in the above description and shown in the accompanying drawings shall be interpreted as illustrative only of particular embodiments and not limiting. Changes in detail or structure may be made without departing from the basic elements of the subject matter as defined in the following claims.

What is claimed is:

1. A dock leveler, comprising:
   a deck having a front portion and a rear portion;
   a lip disposed at the front portion of the deck, the lip having a top surface, a front portion, and a rear portion; and,
   a joint connecting the deck to the lip to allow the lip to pivot relative to the deck, the joint comprising:
      a C-shaped shaft coupled to one of the lip or the deck, the C-shaped shaft having a hollow interior that is cylindrically-shaped and a radial opening to the hollow interior, the opening being less than 180 degrees; and,
      a pivot bar coupled to the other of the deck or the lip, the pivot bar being cylindrically-shaped and pivotably disposed in the cylindrically-shaped hollow interior in a manner allowing the lip to pivot relative to the deck between a down position and an up position.

2. The dock leveler of claim 1, wherein the pivot bar comprises a slot and said other of the deck or the lip extending through the opening and being fixed in the slot.

3. The dock leveler of claim 1, wherein the lip is fixed to the pivot bar and the C-shaped shaft is supported by the deck, the pivot bar being supported by the C-shaped shaft.

4. The dock leveler of claim 1, wherein the C-shaped shaft extends an entire width of the deck.

5. The dock leveler of claim 1, wherein the joint connecting the deck to the lip comprises a continuous C-shaped shaft.

6. The dock leveler of claim 5, wherein the joint connecting the deck to the lip comprises a continuous pivot bar.

7. The dock leveler of claim 1, wherein the joint connecting the deck to the lip comprises only one C-shaped shaft and comprises only one pivot bar.

8. The dock leveler of claim 1, wherein the lip further comprises a bottom surface opposite the top surface, the bottom surface comprising a bevel formed thereon to face a bed of a vehicle.

9. The dock leveler of claim 1, wherein the top surface is bent downward at the front portion of the deck.

10. The dock leveler of claim 9, wherein the lip and the deck form an upward facing pocket when the lip is extended from the deck, and wherein the lip is configured to shed debris captured in the upward facing pocket when it rotates downward.

11. The dock leveler of claim 9, wherein the deck extends over a hinge.

12. The dock leveler of claim 11, wherein a deck edge extends over the lip.

13. A dock leveler, comprising:
   a deck having a front portion and a rear portion;
   a lip disposed at the front portion of the deck, the lip having a top surface, a front portion, and a rear portion; and,
   a cylinder joint connecting the deck to the lip to allow the lip to pivot relative to the deck, the cylinder joint being formed by a cylindrically-shaped pivot bar that is configured to fit in a corresponding cylindrically-shaped hollow interior and comprising a radial pivot opening less than 180 degrees.

14. The dock leveler of claim 13, wherein the cylinder joint comprises:
   a C-shaped shaft coupled to one of the lip or the deck, the C-shaped shaft comprising the cylindrically-shaped hollow interior and the radial pivot opening that extends to the cylindrically-shaped hollow interior; and,
   the cylindrically-shaped pivot bar that is coupled to the other of the deck and the lip, the cylindrically-shaped pivot bar being pivotably disposed in the cylindrically-shaped hollow interior in a manner allowing the lip to pivot relative to the deck between a down position and an up position.

15. The dock leveler of claim 14, wherein the cylinder joint connecting the deck to the lip comprises a continuous C-shaped shaft.

16. The dock leveler of claim 15, wherein the cylinder joint connecting the deck to the lip comprises a continuous pivot bar.

17. The dock leveler of claim 13, wherein one of the deck or the lip projects from the radial pivot opening and pivots relative to the other of the deck and the lip.

18. The dock leveler of claim 17, wherein the cylindrically-shaped pivot bar comprises a slot, and one of the deck or the lip extends through the radial pivot opening and into the slot.

19. The dock leveler of claim 14, wherein the lip is fixed to the cylindrically-shaped pivot bar and the C-shaped shaft is supported by the deck.

20. The dock leveler of claim 13, wherein the cylinder joint extends an entire width of the deck.

21. The dock leveler of claim 13, wherein the cylinder joint connecting the deck to the lip comprises a continuous C-shaped shaft and comprises more than one pivot bar.

22. The dock leveler of claim 13, wherein the lip further comprises a bottom surface, the bottom surface comprising a bevel formed thereon to face a bed of a vehicle.

* * * * *